US012711491B2

(12) United States Patent
Chen et al.

(10) Patent No.: US 12,711,491 B2
(45) Date of Patent: Aug. 18, 2026

(54) USING BLOCKCHAIN WALLET FOR TWO-FACTOR AUTHENTICATION

(71) Applicant: Coinbase, Inc., Oakland, CA (US)

(72) Inventors: Leo Chen, New York, NY (US); Alex Reeve, San Francisco, CA (US); Nick Janda, Loveland, CO (US); Eduardo Salazar, Danville, CA (US)

( * ) Notice: Subject to any disclaimer, the term of this patent is extended or adjusted under 35 U.S.C. 154(b) by 87 days.

(21) Appl. No.: 18/199,914

(22) Filed: May 19, 2023

(65) Prior Publication Data

US 2024/0386417 A1 Nov. 21, 2024

(51) Int. Cl.
*G06Q 20/36* (2012.01)
*G06Q 20/38* (2012.01)
*G06Q 20/40* (2012.01)

(52) U.S. Cl.
CPC ..... *G06Q 20/3674* (2013.01); *G06Q 20/3825* (2013.01); *G06Q 20/3829* (2013.01); *G06Q 20/388* (2013.01); *G06Q 20/4014* (2013.01); *G06Q 2220/00* (2013.01)

(58) Field of Classification Search
CPC ........... G06Q 20/3674; G06Q 20/3825; G06Q 20/3829; G06Q 20/388; G06Q 20/4014; G06Q 2220/00
See application file for complete search history.

(56) References Cited

U.S. PATENT DOCUMENTS 11,711,219 B1 * 7/2023 Liang ..................... G06Q 20/02 713/182
2007/0033643 A1 * 2/2007 Rossi .................... H04L 63/205 726/10
2015/0324789 A1 * 11/2015 Dvorak ................. H04L 9/3297 705/67
2016/0005032 A1 * 1/2016 Yau .................... G06Q 20/3674 705/69
2020/0104841 A1 * 4/2020 Osborn ................ G06Q 20/343
2020/0228520 A1 * 7/2020 Thampi ............... H04L 63/0853
2020/0342424 A1 * 10/2020 Friedlander .......... G06Q 20/381
2021/0398134 A1 * 12/2021 Dumas ............... G06Q 20/3674
(Continued)

OTHER PUBLICATIONS

Mwrwan Abubakar et al., A Lightweight and User-Centric Two-Factor Authentication Mechanism for IoT Based on Blockchain and Smart Contract, May 1, 2022, IEEE, pp. 91-96 (Year: 2022).*

*Primary Examiner* — Nilesh B Khatri
(74) *Attorney, Agent, or Firm* — Holland & Hart LLP

(57) ABSTRACT

Methods, systems, and devices for using a blockchain wallet for two-factor authentication are described. A custodial token platform implements a two-factor authentication process using a wallet to facilitate verifying a user identity accessing an application or service. The platform receives, from a client application on a user device, an authentication request that is associated with a first user account. The platform transmits a response indicating that a wallet authentication procedure is enabled and the response may include a wallet address. The platform receives a challenge request that includes the wallet address. The platform transmits a challenge response that includes a data payload to be signed using a private key associated with the wallet address. The platform receives a signed response message. The platform verifies that the signed response message is validly signed, and the platform transmits an indication that the signed response message is validly signed.

18 Claims, 14 Drawing Sheets

(56) References Cited

U.S. PATENT DOCUMENTS

| | | | | |
|---|---|---|---|---|
| 2022/0029826 | A1* | 1/2022 | Smith, III | H04L 9/0861 |
| 2022/0237595 | A1* | 7/2022 | Roach | H04L 9/0822 |
| 2023/0281606 | A1* | 9/2023 | Jakobsson | H04L 9/50 705/67 |
| 2023/0421399 | A1* | 12/2023 | Quirk | H04L 9/3239 |
| 2024/0154952 | A1* | 5/2024 | Macomber | G06F 21/31 |
| 2024/0346493 | A1 | 10/2024 | Arnold et al. | |
| 2024/0370853 | A1* | 11/2024 | Kumagai | G06Q 30/00 |
| 2024/0378593 | A1 | 11/2024 | Campos et al. | |
| 2024/0386418 | A1 | 11/2024 | Chen et al. | |
| 2025/0182092 | A1* | 6/2025 | Embrechts | H04L 9/0897 |

* cited by examiner

600

USING BLOCKCHAIN WALLET FOR TWO-FACTOR AUTHENTICATION

FIELD OF TECHNOLOGY

The present disclosure relates generally to data management, including techniques for using a blockchain wallet for two-factor authentication.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
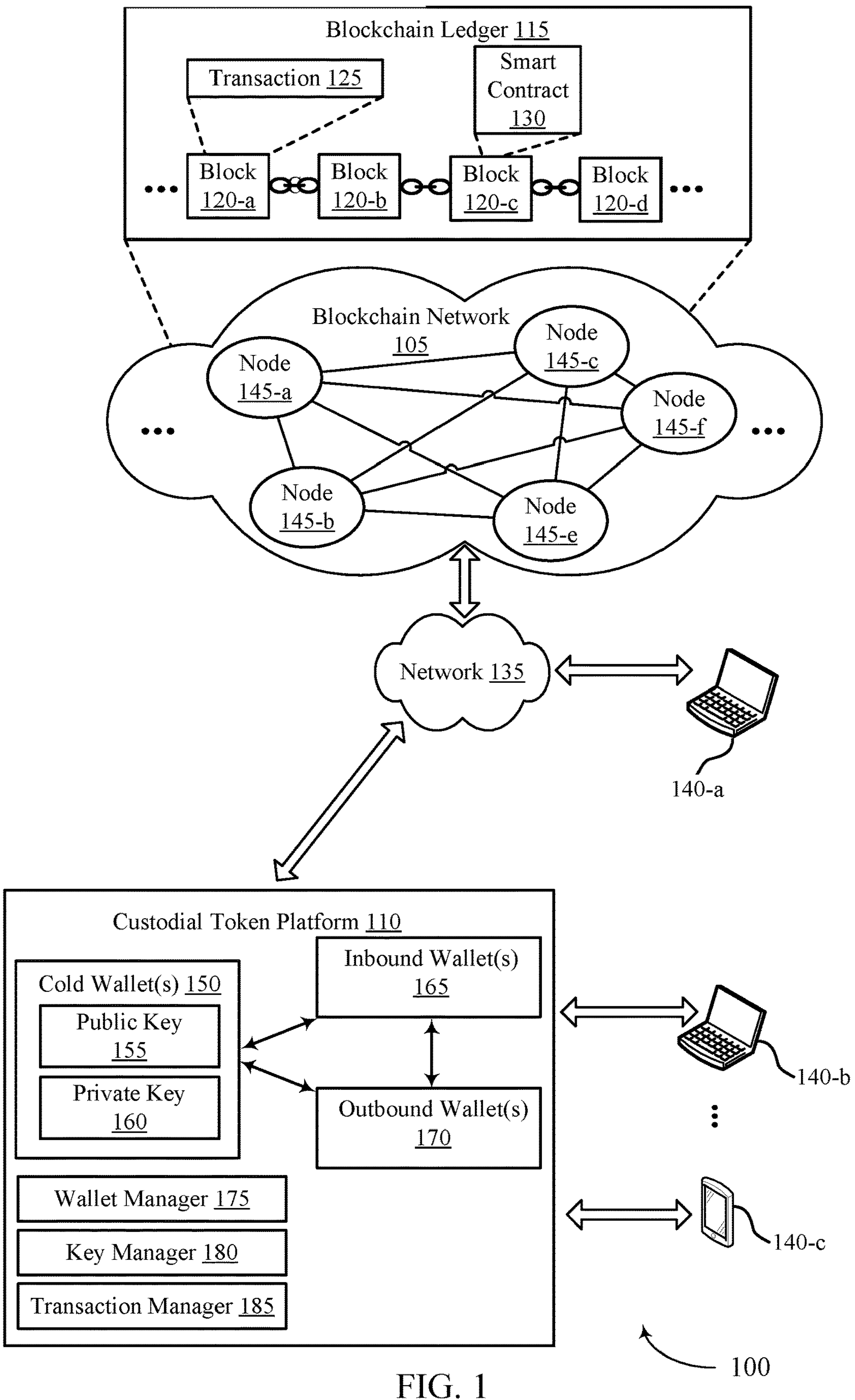
FIG. 1 illustrates an example of a computing environment that supports using a blockchain wallet for two-factor authentication in accordance with aspects of the present disclosure.

A user may access various online client applications and the client applications may request authentication to confirm identity of the user. For example, the applications may request that the user enters a username and an associated password. However, usernames may be easily discovered. For example, users often select an email address as the username and emails can be easily ascertained through public sites. Passwords may be difficult to remember so users often select simple passwords or use the same password for multiple applications, making passwords also easy to ascertain. Accordingly, many client applications have added an additional authentication layer for more security, such as two-factor authentication or multiple-factor (multi-factor) authentication (e.g., two or more authentication factors). Two-factor authentication is a security process that involves the user providing two different authentication factors or steps to verify the identity of the user to access the user account on the client application. In the two-factor security process, the user may confirm identity in a second authentication process after successfully confirming identity in a first authentication process, such as by correctly entering the username and password. For example, the second factor of the two-factor security process may involve a different factor from the first factor, such as a biometric factor (e.g., facial scan or fingerprint) or confirmation of identity via another client application or device that is associated with the user.

In some examples, users that are utilizing the two-factor authentication may also access a custodial application associated with a custodial token platform. The custodial application may provide access to wallets associated with a user in the custodial application, where the wallets provide control of digital assets associated with the user. For example, a user may access a custodial token platform through the custodial application to purchase, sell, exchange, or trade digital assets, such as cryptocurrencies, crypto tokens, or the like. A custodial token platform may support various types of wallets for deposits, withdrawals, and storage. For example, the custodial token platform may generate inbound wallets associated with inbound addresses for user deposits of crypto tokens to accounts associated with the user. The custodial token platform may also use outbound wallets for supporting withdrawals of crypto tokens and cold storage wallets for security. The user may access these wallets via authentication procedures, as described herein.

Techniques described herein facilitate two-factor authentication by supporting two-factor authentication using a digital wallet. A digital wallet authentication procedure may be enabled for the user using a client application, and one or more servers (e.g., one or more servers that support a custodial token platform) may send a challenge request to the client application, where the challenge request includes the wallet address. The one or more servers may verify that a message was validly signed from the user after receiving the request, authenticating the user. This technique of using the wallet authentication procedure as part of the two-factor authentication may result in increased security of accounts associated with the user, as well as provide an efficient way to authenticate the user using the existing wallet associated with the user.

In some examples, to authenticate a client application, one or more servers associated with the custodial token platform may receive, from the client application on a user device, an authentication request that is associated with a first user account for a service supported by the one or more servers. The one or more servers may transmit, to the client application, a response that indicates that a wallet authentication procedure is enabled for the first user account, and the response may include a wallet address associated with the first user account. The one or more servers may receive, from the client application in accordance with the wallet authentication procedure, a challenge request that includes the wallet address. The one or more servers may transmit, to the client application, a challenge response that includes a data payload to be signed using a private key associated with the wallet address. The one or more servers may receive, from the client application, a signed response message in response to transmitting the challenge response. The one or more servers may verify that the signed response message is validly signed by the private key associated with the wallet address. The one or more servers may transmit, to the client application after verifying that the signed response message is validly signed, an indication that the signed response message is validly signed.

In some examples, the one or more servers may identify, after receiving the authentication request, that a set of authentication procedures of multiple authentication procedures is enabled for the first user account, where the response indicates the set of enabled authentication procedures. In some examples, transmitting the challenge response includes information indicating an action to be performed by the client application, where the action to be performed by the client application includes obtaining the signed response message from a wallet application. In some examples, the one or more servers may transmit a proof token to the client application. These and other techniques are described in further detail with respect to the figures.

FIG. 1 illustrates an example of a computing environment 100 that supports using a blockchain wallet for two-factor authentication in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180) may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

Additionally, a user may access the custodial token platform 110 via a custodial application to purchase, sell, exchange, or trade digital assets, such as cryptocurrencies, crypto tokens, or the like. In some examples, the custodial token platform 110 supports using a blockchain wallet for two-factor authentication associated with the user. Two-factor authentication is the process of an electronic authentication method in which a user is granted access to a website or application after successfully authenticating identity using two or more different methods. For example, the commonly used first factor of the two-factor authentication procedure may be a username (or email) and password and the commonly used second factor of the two-factor authentication may be biometrics using your fingerprint, face, or retina. Although two-factor authentication is more secure than a one-factor authentication, the commonly used second factor, such as biometric authentication, may be susceptible to data breaches (e.g., biometric databases may be hacked), expensive, and may limit privacy of the user (e.g., biometrics may be tracked).

Techniques described herein address the forgoing by supporting a two-factor authentication using blockchain wallets. The wallet may already be associated with the user or the user account (e.g., at the custodial token platform). Authenticating using the wallet may also involve a private key which the user has access to, such as a private key associated with a non-custodial or self-custody wallet, which is more secure than other authentication methods. As such, the authentication process using the wallet may result in efficient authentication, as well as more secure authentication relative to other authentication procedures.

As described herein, the term "wallet" refers to a digital wallet that provides the associated user with control of any crypto currency owned by the user. Private keys (that represent ownership of the cryptocurrency) for the wallet may be stored directly on a device 140 associated with the user or may be access via the device 140 associated with the user. In some examples, the wallet may not be managed by custodial token platform 110 but may be associated with an account managed by the custodial token platform 110. As described herein, the term "two-factor authentication" refers to an identity and access management security process that utilizes two forms of identification to access resources and data. As described herein, the term "wallet authentication procedure" refers to an identity and access management security process that utilizes the wallet associated with a user of the custodial token platform 110 for identification. The wallet authentication procedure may be part of the two-factor authentication, such as one of the factors in the two-factor authentication procedure. The authentication procedure described with respect to FIG. 1 is described with respect to accessing the custodial token platform 110, but it should be understood that the wallet authentication procedure may be used to access other services supported by one or more servers.

Figure 2:
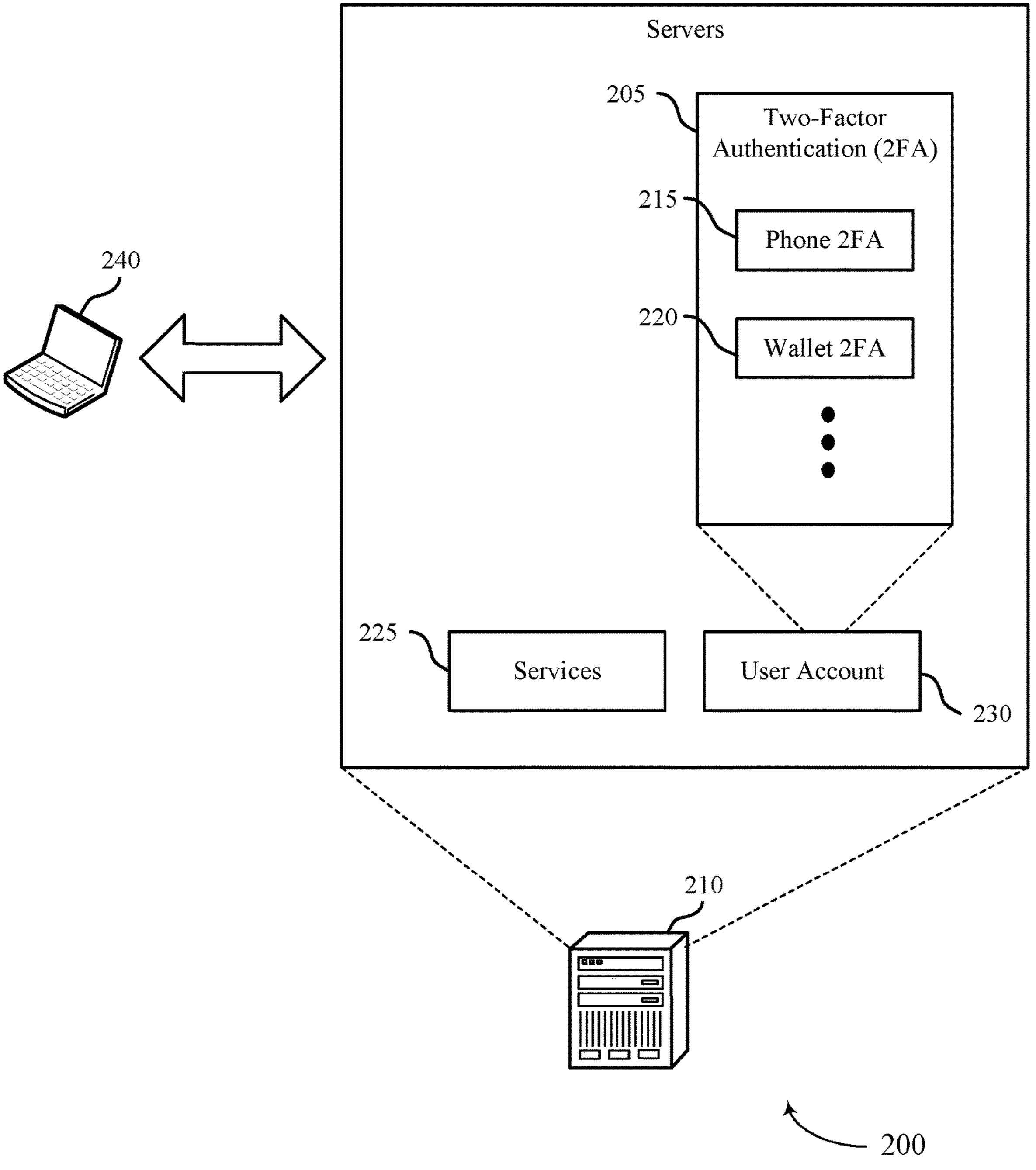
FIG. 2 shows an example of a computing environment that supports using a blockchain wallet for two-factor authentication in accordance with aspects of the present disclosure.

FIG. 2 shows an example of a computing environment 200 that supports using a blockchain wallet for two-factor authentication in accordance with aspects of the present disclosure. The computing environment 200 includes one or more servers 210, one or more services 225, a user account 230, and a user device 240 that is associated with the user account 230 of a user. The servers 210 may be an example of one or more servers supporting the custodial token platform 110 as described with respect to FIG. 1, and the user device 240) may be examples of the computing devices 140 as described with respect to FIG. 1. Although the discussions described herein relate to cryptocurrency with respect to crypto tokens, the cryptocurrency may include tokens, coins, digital currency, and the like.

The servers 210 may support various services 225, such as services offered by the custodial token platform 110 of FIG. 1. Additionally, or alternatively, the servers 210 may support other types of services 225 that may implement authentication procedures to access such services. The services 225 may be examples of various types of web service, application service, database service, or the like. In some examples, the services 225 are web3 enabled services, such as a token-gated service. In some examples, the servers 210 may store or access token-related data, as well as support various token-related transactions for various purposes. In some examples, the servers 210 may support authentication procedures, such as one or more two-factor authentication (2FA) procedures 205 for accessing the services 225, which may involve a phone authentication procedure 215 (Phone 2FA), a wallet authentication procedure 220 (2FA), and other authentication procedures using data stored at or accessible by the servers 210. As part of the authentication procedures, the servers 210 may communicate with the user device 240 (e.g., transmit to or receive from the user device 240). In some examples, the two-factor authentication procedures 205 may support or access the user account 230, for example, to obtain information used for providing the services 225 to the user device 240) (e.g., phone number associated with the user account for using in the two-factor authentication service). In some examples, the phone authentication procedure 215 may be the first factor authentication and the wallet authentication procedure 220 may be the second factor authentication of the two-factor authentication procedure 205. Additionally, or alternatively, the first factor of a two-factor authentication procedure is a username (or email) and password combination.

The user may access the user account 230 via a user interface on the user device 240) such as to configure setting, enter account information, etc. In some examples, the user access the user account 230 such as to enable one or more of the two-factor authentication procedures 205. More particularly, the services 225 may require that at least one two-factor authentication procedure 205 is used to access the services 225. As such, the user may selectably enable and configure one or more of the two-factor authentication procedures via the user account. For example, for the phone two-factor authentication procedure, the user may enter the phone number and may perform a test authentication (e.g., by entering a passcode received via the phone number). For the wallet authentication procedure 220, the user may connect a wallet (e.g., via a browser wallet application) or via an application local to the user device 240. In such cases, the user may digitally sign a message generated via the user account or services 225 such as to authenticate the wallet.

Connection of the wallet may include entering the public key associated with the wallet, scanning an indication of a wallet address (e.g., a quick-response (QR) code), or the like.

Implementation of the phone authentication procedure 215 may involve authenticating the identity of a user by calling a mobile device associated with the user. In another example, the phone authentication procedure 215 may involve authenticating the identity of a user by sending a text message to the mobile device associated with the user. The phone number for the user may be stored or accessible to the servers 210. In some examples, authentication may be completed after the mobile device receives the phone call or text message or after the user entering a code (e.g., a number) on the application requesting authentication. The code may be provided over the phone call or text message. In some examples, the user may enable and configure multiple of the two-factor authentication procedures, and may select the procedure to use when logging-in to access one of the services 225.

The wallet authentication procedure 220 may involve the servers 210 transmitting a message (e.g., authentication request) to a wallet address that is connected to the wallet of the user. For example, the user device 240 may receive the message at a user interface of the user device 240 (e.g., at a client application or wallet application) to sign the message. The user may sign the message, which may be subsequently transmitted to the servers 210 for verification. The servers 210 may return a proof token to the user device 240 if the signature is accepted.

Figure 3:
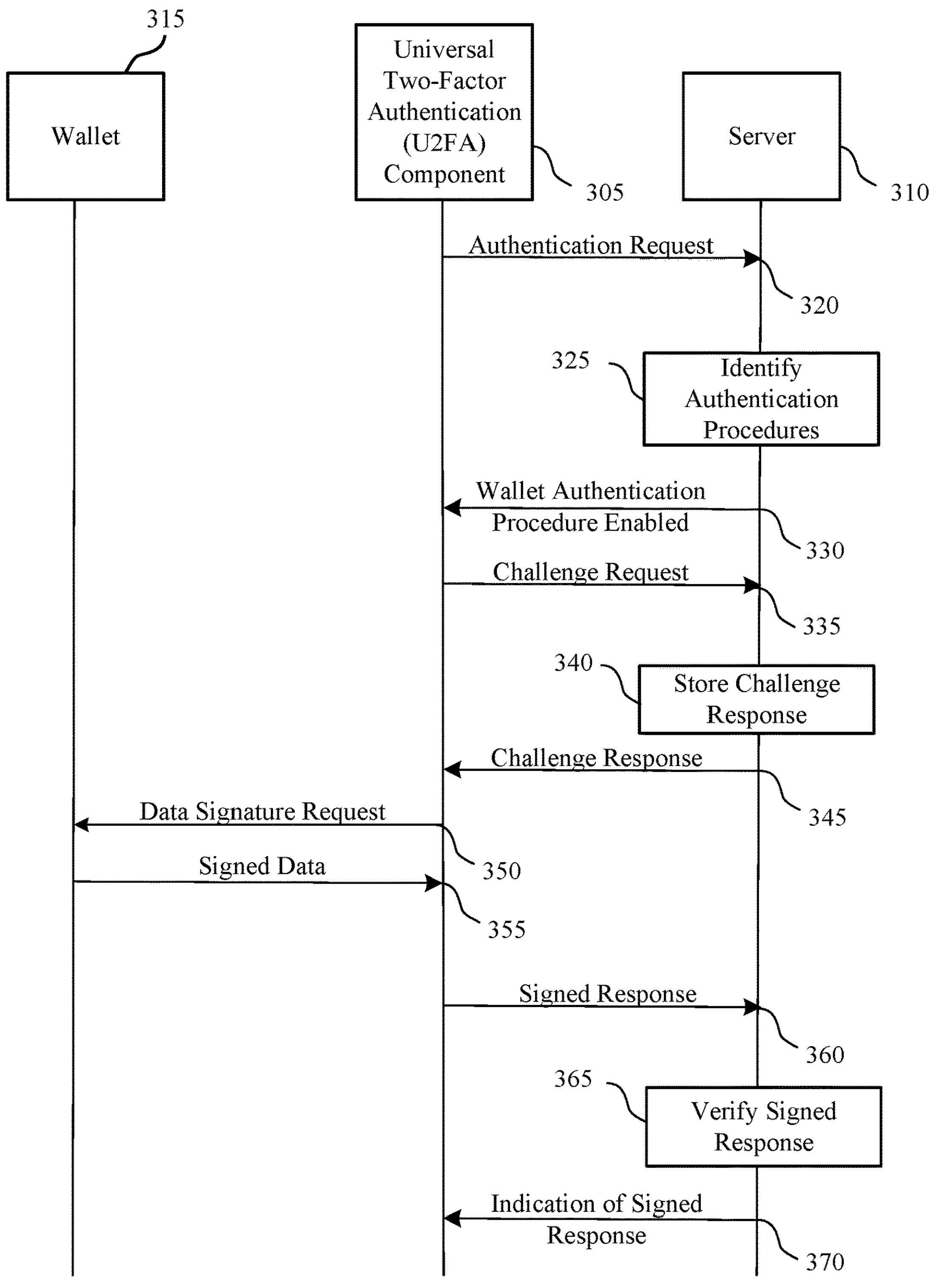
FIG. 3 shows an example of a process flow that supports using a blockchain wallet for two-factor authentication in accordance with aspects of the present disclosure.

FIG. 3 shows an example of a process flow 300 that supports using a blockchain wallet for two-factor authentication in accordance with aspects of the present disclosure. The process flow 300 includes a universal two-factor authentication component 305 (U2FA component), a server 310, and a wallet 315, which may be examples of the corresponding devices or systems as described herein with respect to FIG. 1 and FIG. 2. For example, the server 310 may be an example of one or more servers that support a custodial token platform 110 as described with respect to FIG. 1. In the following description of the process flow 300, the operations between the two-factor authentication component 305, the server 310, and the wallet 315, may be transmitted in a different order than the example order shown, or the operations performed may be performed in different orders or at different times. Some operations may also be omitted from the process flow 300, and other operations may be added to the process flow 300.

The universal two-factor authentication component 305 may be a client application (e.g., web front-end accessible via a browser or standalone application) that is used to access one or more services supported by the server 310, such as services supported by the custodial token platform 110 of FIG. 1. As such, universal two-factor authentication component 305 may be executed by a user device of a user. In some examples, a user may initiate a two-factor authentication procedure in a universal two-factor authentication component user interface of the universal two-factor authentication component 305. The wallet 315 may be an example of a wallet application (e.g., client application) that is also accessible by the user device. In some examples, the wallet 315 may be connected to the universal two-factor authentication component 305. At 320, server 310 may receive from the universal two-factor authentication component 305 on a user device, an authentication request that is associated with a first user account for a service supported by the one or more servers. At 325, the server 310 may identify, after receiving the authentication request, that a set of authentication procedures of multiple authentication procedures (including the wallet authentication procedure) is enabled for the first user account.

At 330, the server 310 may transmit, to the universal two-factor authentication component 305, a response that indicates that a wallet authentication procedure is enabled for the first user account. The response may include a wallet address associated with the first user account. The response may also indicate other authentication procedures enabled for the user account. In some examples, the server 310 may also indicate whether the first account user has a particular crypto token address, such as an Ethereum address, which is registered as a two-factor authentication procedure, as well as an array or an indication of multiple registered addresses. In such examples, the user may choose an address to be used for to perform the two-factor authentication via the universal two-factor authentication component 305. It should be understood that wallets/addresses associated with blockchains different from the Ethereum blockchain may be used to support the wallet two-factor authentication procedures described herein.

At 335, the server 310 may receive from the universal two-factor authentication component 305 in accordance with the wallet authentication procedure, a challenge request that includes the wallet address (e.g., chosen Ethereum address). In some examples, the server 310 may request for the user to sign a message including a client action, a random universal unique identifier (UUID), or both. At 340, the server 310 may store a challenge record in a database, where the challenge record indicates the selected address and the message, to be used as a challenge response. For example, the server 310 may store the challenge response in memory of the one or more servers in association with the wallet address.

At 345, the server 310, transmit, to the universal two-factor authentication component 305, the challenge response that includes a data payload to be signed using a private key associated with the wallet address. The data payload may be an example of a nonce (e.g., "1234-1234- . . . ") In some examples, the challenge response may include information indicating an action to be performed by the universal two-factor authentication component 305 (e.g., client application), where the action to be performed by the universal two-factor authentication component 305 includes obtaining a signed response message from a wallet application.

In some examples, the wallet 315 may be connected to, communicate with, or be integrated with the universal two-factor authentication component 305 (e.g., the client application). The wallet may be a wallet mobile application (e.g., installed on the mobile device of the user), a wallet browser extension (e.g., exists in the browser), or a wallet application associated with a hardware wallet separate from the user device. At 350, the universal two-factor authentication component 305 may transmit to the wallet 315, a data signature request. The data signature request may include the data payload received from the server 310 to be signed by the private key associated with the wallet application and the first user account. At 355, the wallet 315 may provide signed data (e.g., the signed data payload) to the universal two-factor authentication component 305, where the signed data includes a signed message. Signing may involve using a private key associated with the wallet 315.

At 360, the server 310 may receive, at the one or more servers and from the universal two-factor authentication component 305, a signed response message in response to transmitting the challenge response. The signed response message may be based on or may be the signed data (e.g., at 355). At 365, the server 310 may verify, at the one or more servers, that the signed response message is validly signed by the private key associated with the wallet address. This may involve the server 310 decoding the signed response message using the challenge response to identify the wallet address, and verifying that the wallet address matches the wallet address stored in association with the challenge response. For example, the server 310 may use a public key paired with the private key to for decoding, and a successful decoding and comparison may indicate verification.

At 370, the server 310 may transmit, an indication that the signed response message is validly signed (e.g., successful validation), to the universal two-factor authentication component 305 after verifying that the signed response message is validly signed. In some examples, the indication may be a proof token (e.g., a JavaScript object notation (JSON) web-token.

Figure 4:
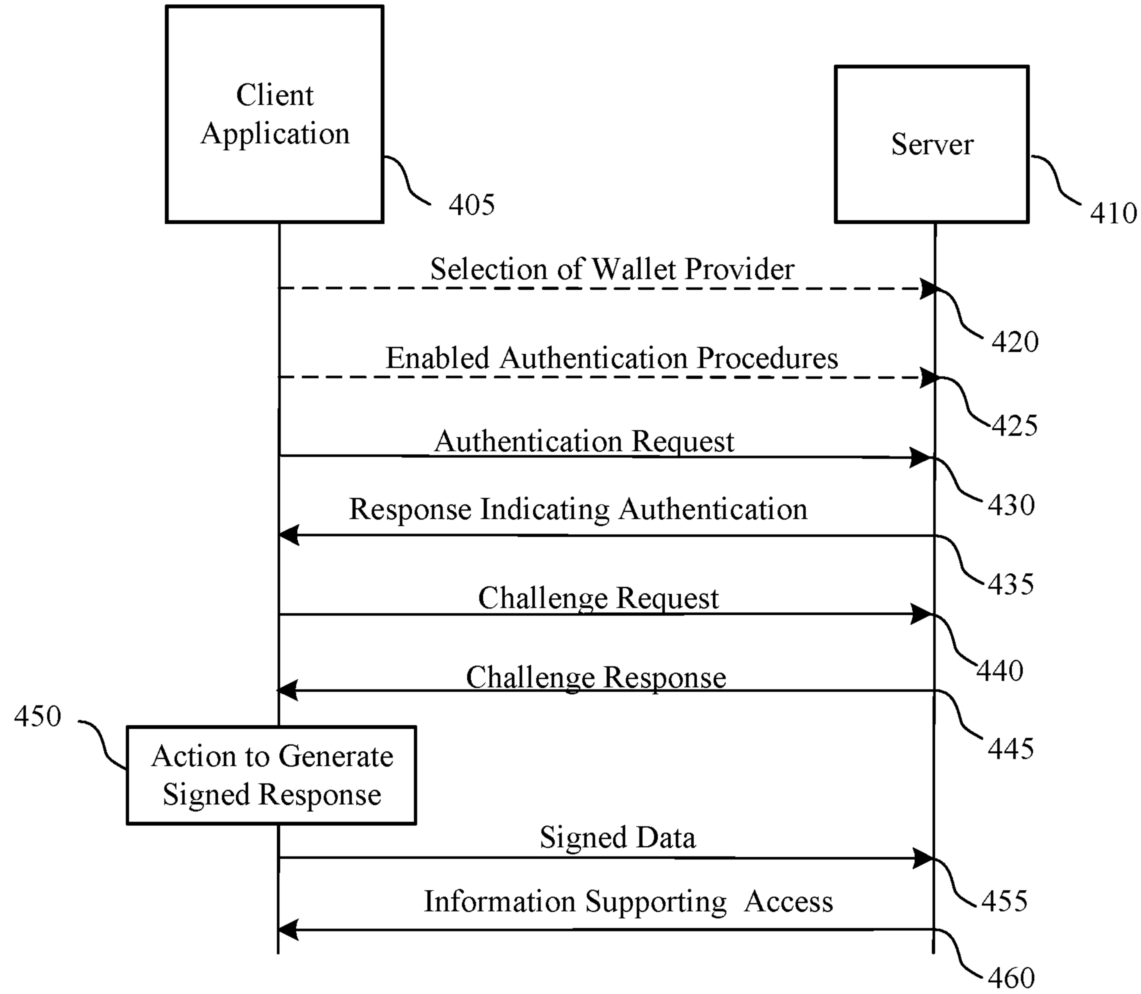
FIG. 4 shows an example of a process flow that supports using a blockchain wallet for two-factor authentication in accordance with aspects of the present disclosure.

FIG. 4 shows an example of a process flow 400 that supports using a blockchain wallet for two-factor authentication in accordance with aspects of the present disclosure. The process flow 400 includes a client application 405 and a server 410, which may be examples of the corresponding devices or systems as described herein with respect to FIGS. 1 through 3. For example, the client application 405 may be an example of a front-end application (e.g., web-client), a standalone application, or the like, that includes a universal two-factor authentication component, as described herein. Further, the server 410 may be an example of one or more servers supporting a custodial token platform or other services, as described herein. In the following description of the process flow 400, the operations between the client application 405 and the server 410 may be transmitted in a different order than the example order shown, or the operations performed may be performed in different orders or at different times. Some operations may also be omitted from the process flow 400, and other operations may be added to the process flow 400.

In some examples, the client application 405 may receive (from the universal two-factor authentication user interface of the client application 405) a selection of a wallet provider, of multiple wallet providers, for authenticating at the service supported by the server 410. In some examples, at 420, the client application 405 may transmit an indication of the selection of the wallet provider to the server 410.

In some examples, the client application 405 may receive at least one input to enable a set of authentication procedures of multiple authentication procedures for the first user account, where the set of enabled authentication procedures includes at least the wallet authentication procedure. In some examples, at 425, the client application 405 may transmit an indication of the enabled authentication procedures.

At 430, the client application 405 may transmit, to the server 410, and from the client application 405, an authentication request that is associated with a first user account for a service supported by the one or more servers. The client application 405 may also transmit an indication that a wallet authentication procedure is enabled for the first user account for a service supported by the one or more servers.

At 435, the client application 405 may receive, from the one or more servers, a response that indicates that a wallet authentication procedure is enabled for the first user account, where the response includes a wallet address associated with the first user account. In some examples, the wallet authentication procedure may be enabled for multiple wallet addresses associated with the first user account, and the response indicates the multiple wallet addresses.

At 440, the client application 405 may transmit, to the one or more servers and from the client application in accordance with the wallet authentication procedure, a challenge request that includes the wallet address. At 445, the client application 405 may receive, a challenge response that includes a data payload. In some examples, the client application 405 may communicate, to a wallet application, the data payload to be signed by a private key associated with the wallet application and the first user account, and the signed response message may be received after communicating the data payload to the wallet application.

In some examples, receiving the challenge response may include information indicating the action to be performed by the client application. For example, the action to be performed by the client application includes providing the signed response message received from a wallet application. In some examples, the wallet authentication procedure may be enabled for multiple wallet addresses associated with the first user account, and the challenge response may indicate the multiple wallet addresses.

At 450, the client application 405 may perform an action to generate a signed response message using the data payload. For example, the user may provide input to provide the action. At 455, the client application 405 may transmit the signed response message to the one or more servers. At 460, the client application 405 may receive information that supports access to the service by the client application. In some examples, the information may be a proof token, which may indicate successful verification of identity at the one or more servers of the custodial token platform.

Figure 5:
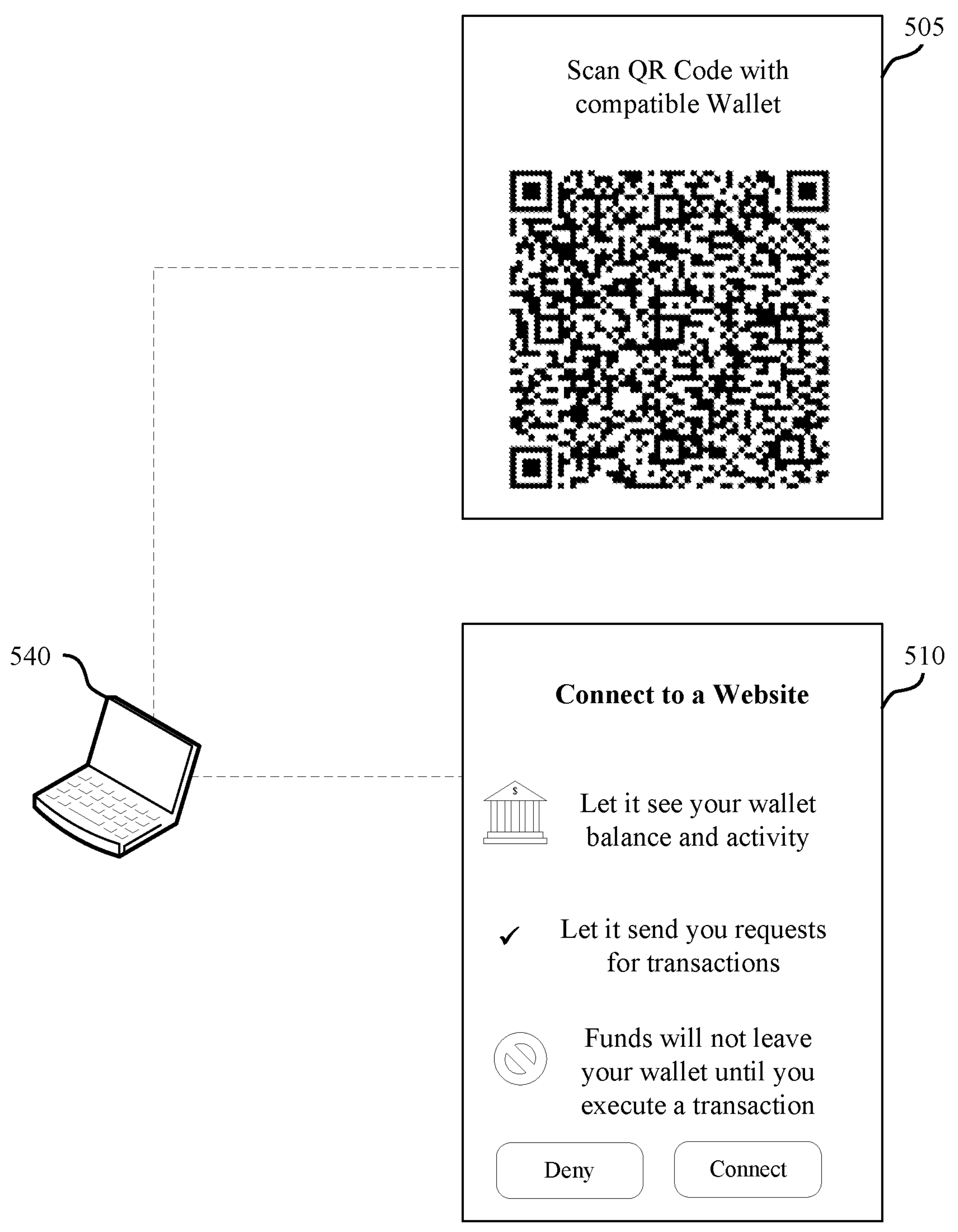
FIG. 5 shows an example of a wallet connection selection that supports using a blockchain wallet for two-factor authentication in accordance with aspects of the present disclosure.

FIG. 5 shows an example of a wallet connection selection 500 that supports using a blockchain wallet for two-factor authentication in accordance with aspects of the present disclosure. The wallet connection selection 500 may include one or more wallet connection options for a user device 540 of a user. The user device 540 may be an example of the computing device 140 as described with respect to FIG. 1.

One or more of the wallet connection options may be available if the wallet has not been configured for use for the two-factor authentication procedure of a service, such as the custodial platform, or if the connection has expired. For example, the user may use the user device 540, such as a camera or other image capturing component, to scan a QR code 505 to initiate connecting the wallet associated with the user to the two-factor authentication procedure of the custodial token platform. The QR code 505 may include a message indicating connection associated with the QR code 505 ("Scan QR Code with compatible Wallet"). In some examples, the QR code 505 may be scanned in a wallet application (e.g., client application), such as a wallet browser extension or in a wallet mobile application. In some examples, the user may be prompted by a prompt 510 in the wallet browser extension or wallet mobile application. The prompt may request for permission to connect a wallet to the two-factor authentication procedure of the custodial platform. The prompt may indicate the features that may be provided after connecting the wallet ("Let it see your wallet balance and activity," "Let it send you requests for transactions," and "Funds will not leave your wallet until you execute a transaction"). The user may select "connect" in order to connect the wallet or select "deny" in order to decline connecting the wallet to the two-factor authentication procedure. If the wallet has already been connected, these steps may be skipped.

Figure 6:
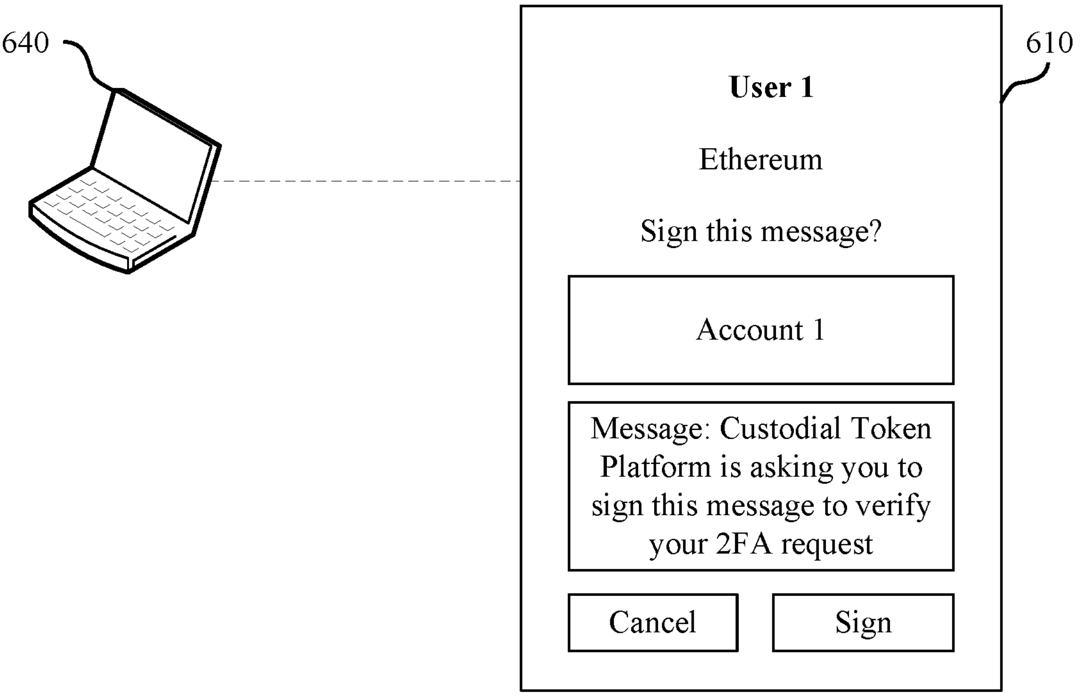
FIG. 6 shows an example of a challenge response that supports using a blockchain wallet for two-factor authentication in accordance with aspects of the present disclosure.

FIG. 6 shows an example of a challenge response 600 that supports using a blockchain wallet for two-factor authentication in accordance with aspects of the present disclosure. The challenge response 600 may include signature options 610 to sign the challenge response on a universal two-factor authentication user interface on the user device 640. The user device 640 may be an example of the computing device 140 as described with respect to FIG. 1.

The signature options 610 may indicate the user (first user, "user 1") that owns the wallet associated with the challenge response 600 and associated with the user account for the serving being accessed, an indication of the account (first account "Account 1") used for the wallet authentication procedure, a message requesting the verification ("Message: Custodial Token Platform is asking you to sign this message to verify your 2FA request"), a "cancel" option, and a "sign" option to provide a signature. In response to the user input selecting "sign" to provide signature, the wallet application signs the message with the private key (creating a "signature"), and returns the signature to the universal two-factor authentication component. The universal two-factor authentication component may transmit the signature to the custodial token platform in a verify request (e.g., signed response at 350 of FIG. 3). The custodial token platform may extract the owner address from the signature and compare it to the registered address, as discussed with respect to FIG. 2. If the owner address from the signature matches the registered address, the one or more servers may send a proof token to the universal two-factor authentication component in a verify response message (e.g., Indication of Signed Response at 360 of FIG. 3).

Figure 7:
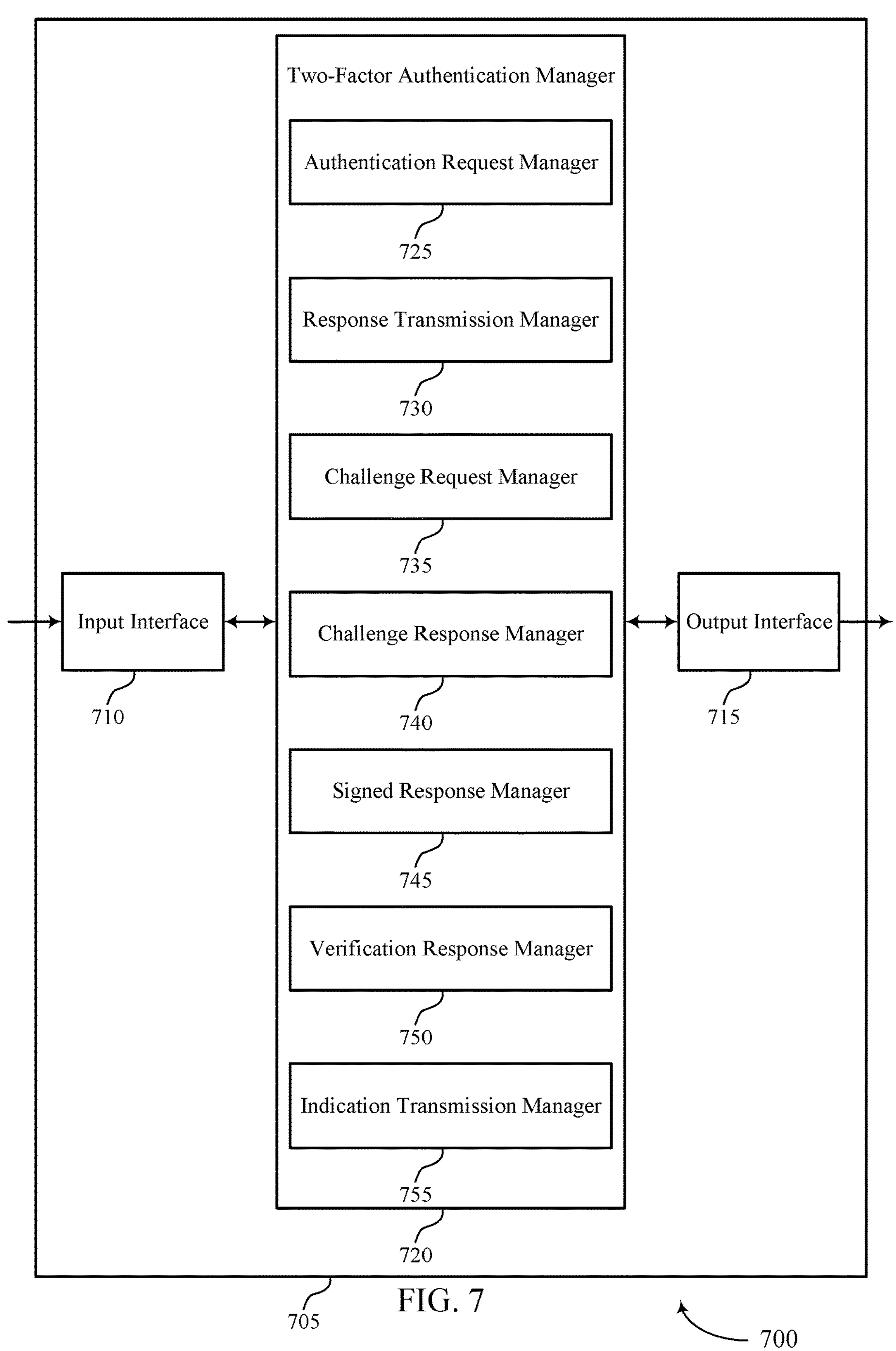
FIG. 7 shows a block diagram of an apparatus that supports using a blockchain wallet for two-factor authentication in accordance with aspects of the present disclosure.

FIG. 7 shows a block diagram 700 of a system 705 that supports using a blockchain wallet for two-factor authentication in accordance with aspects of the present disclosure. The system 705 may include an input interface 710, an output interface 715, and a two-factor authentication manager 720. The system 705 may also include a processor. Each of these components may be in communication with one another (e.g., via one or more buses, communications links, communications interfaces, or any combination thereof).

The input interface 710 may manage input signaling for the system. For example, the input interface 710 may receive input signaling (e.g., messages, packets, data, instructions, commands, transactions, or any other form of encoded information) from other systems or devices. The input interface 710 may send signaling corresponding to (e.g., representative of or otherwise based on) such input signaling to other components of the system for processing. For example, the input interface 710 may transmit such corresponding signaling to the two-factor authentication manager 720 to support using a blockchain wallet for two-factor authentication. In some cases, the input interface 710 may be a component of a network interface 925 as described with reference to FIG. 9.

The output interface 715 may manage output signaling for the system 705. For example, the output interface 715 may receive signaling from other components of the system 705, such as the two-factor authentication manager 720, and may transmit such output signaling corresponding to (e.g., representative of or otherwise based on) such signaling to other systems or devices. In some cases, the output interface 715 may be a component of a network interface 925 as described with reference to FIG. 9.

For example, the two-factor authentication manager 720 may include an authentication request manager 725, a response transmission manager 730, a challenge request manager 735, a challenge response manager 740, a signed response manager 745, a verification response manager 750, an indication transmission manager 755, or any combination thereof. In some examples, the two-factor authentication manager 720, or various components thereof, may be configured to perform various operations (e.g., receiving, monitoring, transmitting) using or otherwise in cooperation with the input interface 710, the output interface 715, or both. For example, the two-factor authentication manager 720) may receive information from the input interface 710, send information to the output interface 715, or be integrated in combination with the input interface 710, the output interface 715, or both to receive information, transmit information, or perform various other operations as described herein.

The two-factor authentication manager 720 may support authenticating a client application in accordance with examples as disclosed herein. The authentication request manager 725 may be configured as or otherwise support a means for receiving, at one or more servers and from the client application on a user device, an authentication request that is associated with a first user account for a service supported by the one or more servers. The response transmission manager 730 may be configured as or otherwise support a means for transmitting, to the client application, a response that indicates that a wallet authentication procedure is enabled for the first user account, the response including a wallet address associated with the first user account. The challenge request manager 735 may be configured as or otherwise support a means for receiving, at the one or more servers and from the client application in accordance with the wallet authentication procedure, a challenge request that includes the wallet address. The challenge response manager 740 may be configured as or otherwise support a means for transmitting, to the client application, a challenge response that includes a data payload to be signed using a private key associated with the wallet address. The signed response manager 745 may be configured as or otherwise support a means for receiving, at the one or more servers and from the client application, a signed response message in response to transmitting the challenge response. The verification response manager 750) may be configured as or otherwise support a means for verifying, at the one or more servers, that the signed response message is validly signed by the private key associated with the wallet address. The indication transmission manager 755 may be configured as or otherwise support a means for transmitting, to the client application after verifying that the signed response message is validly signed, an indication that the signed response message is validly signed.

Figure 8:
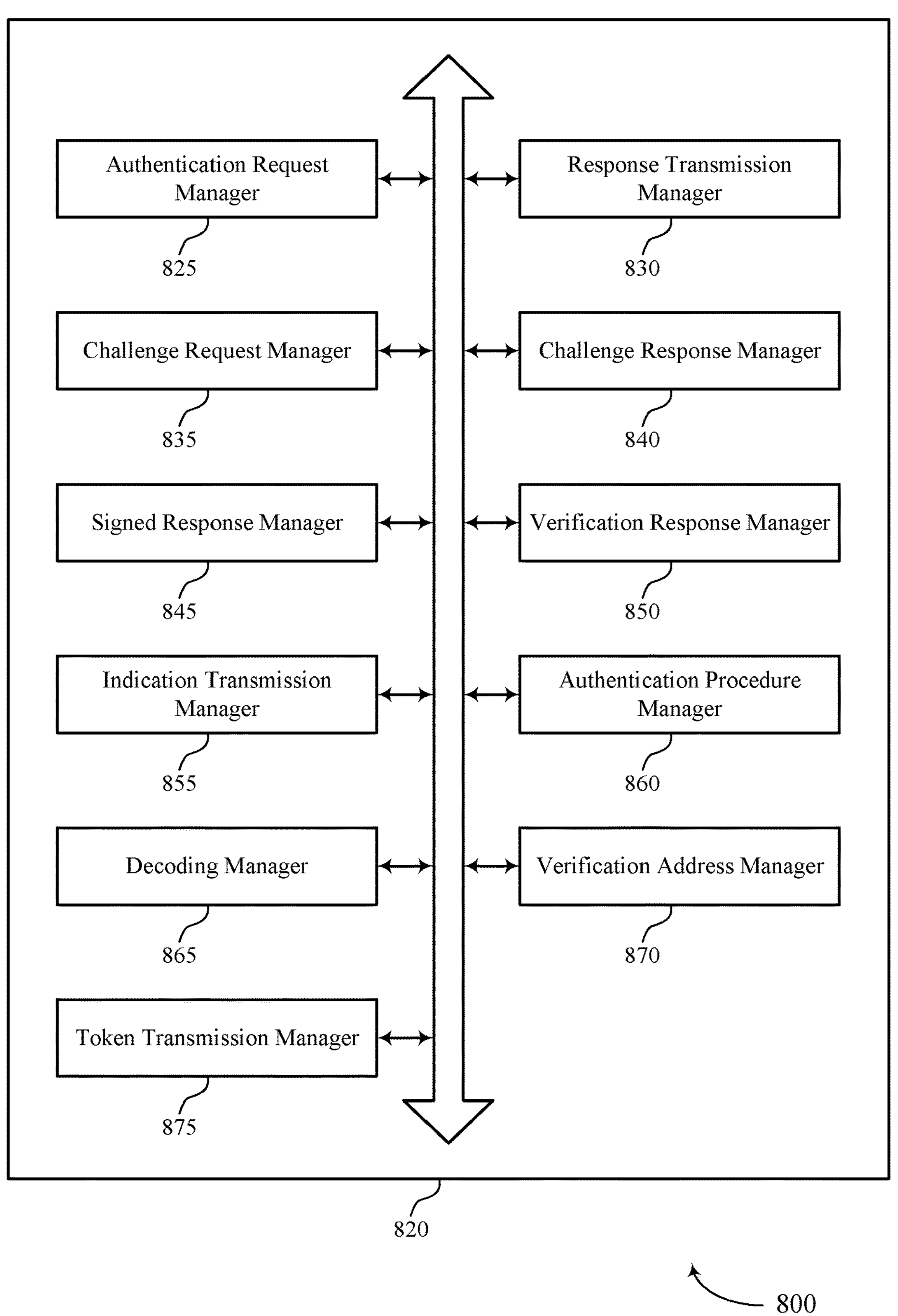
FIG. 8 shows a block diagram of a two-factor authentication manager that supports using a blockchain wallet for two-factor authentication in accordance with aspects of the present disclosure.

FIG. 8 shows a block diagram 800 of a two-factor authentication manager 820 that supports using a blockchain wallet for two-factor authentication in accordance with aspects of the present disclosure. The two-factor authentication manager 820 may be an example of aspects of a two-factor authentication manager or a two-factor authentication manager 720, or both, as described herein. The two-factor authentication manager 820, or various components thereof, may be an example of means for performing various aspects of using a blockchain wallet for two-factor authentication as described herein. For example, the two-factor authentication manager 820 may include an authentication request manager 825, a response transmission manager 830, a challenge request manager 835, a challenge response manager 840, a signed response manager 845, a verification response manager 850, an indication transmission manager 855, an authentication procedure manager 860, a decoding manager 865, a verification address manager 870), a token transmission manager 875, or any combination thereof. Each of these components may be in communication with one another (e.g., via one or more buses, communications links, communications interfaces, or any combination thereof).

The two-factor authentication manager 820 may support authenticating a client application in accordance with examples as disclosed herein. The authentication request manager 825 may be configured as or otherwise support a means for receiving, at a one or more servers and from the client application on a user device, an authentication request that is associated with a first user account for a service supported by the one or more servers. The response transmission manager 830 may be configured as or otherwise support a means for transmitting, to the client application, a response that indicates that a wallet authentication procedure is enabled for the first user account, the response including a wallet address associated with the first user account. The challenge request manager 835 may be configured as or otherwise support a means for receiving, at the one or more servers and from the client application in accordance with the wallet authentication procedure, a challenge request that includes the wallet address. The challenge response manager 840 may be configured as or otherwise support a means for transmitting, to the client application, a challenge response that includes a data payload to be signed using a private key associated with the wallet address. The signed response manager 845 may be configured as or otherwise support a means for receiving, at the one or more servers and from the client application, a signed response message in response to transmitting the challenge response. The verification response manager 850 may be configured as or otherwise support a means for verifying, at the one or more servers, that the signed response message is validly signed by the private key associated with the wallet address. The indication transmission manager 855 may be configured as or otherwise support a means for transmitting, to the client application after verifying that the signed response message is validly signed, an indication that the signed response message is validly signed.

In some examples, the authentication procedure manager 860 may be configured as or otherwise support a means for identifying, after receiving the authentication request, that a set of authentication procedures of a plurality of authentication procedures is enabled for the first user account, wherein the response indicates the set of enabled authentication procedures.

In some examples, the authentication procedure manager 860 may be configured as or otherwise support a means for identifying, after receiving the authentication request, that the wallet authentication procedure is enabled for a plurality of wallet addresses associated with the first user account, wherein the response indicates the plurality of wallet addresses.

In some examples, the verification response manager 850 may be configured as or otherwise support a means for storing the challenge response in memory of the one or more servers in association with the wallet address, wherein the signed response message is verified using the stored challenge response.

In some examples, to support transmitting the challenge response, the response transmission manager 830 may be configured as or otherwise support a means for transmitting the challenge response that includes information indicating an action to be performed by the client application, wherein the action to be performed by the client application includes obtaining the signed response message from a wallet application.

In some examples, to support verifying that the signed response message is validly signed, the decoding manager 865 may be configured as or otherwise support a means for decoding the signed response message using the challenge response to identify the wallet address. In some examples, to support verifying that the signed response message is validly signed, the verification address manager 870 may be configured as or otherwise support a means for verifying that the wallet address matches the wallet address stored in association with the challenge response.

In some examples, to support transmitting the indication that the signed response message is validly signed information, the token transmission manager 875 may be configured as or otherwise support a means for transmitting a proof token to the client application.

In some examples, the one or more servers support a custodial token platform.

Figure 9:
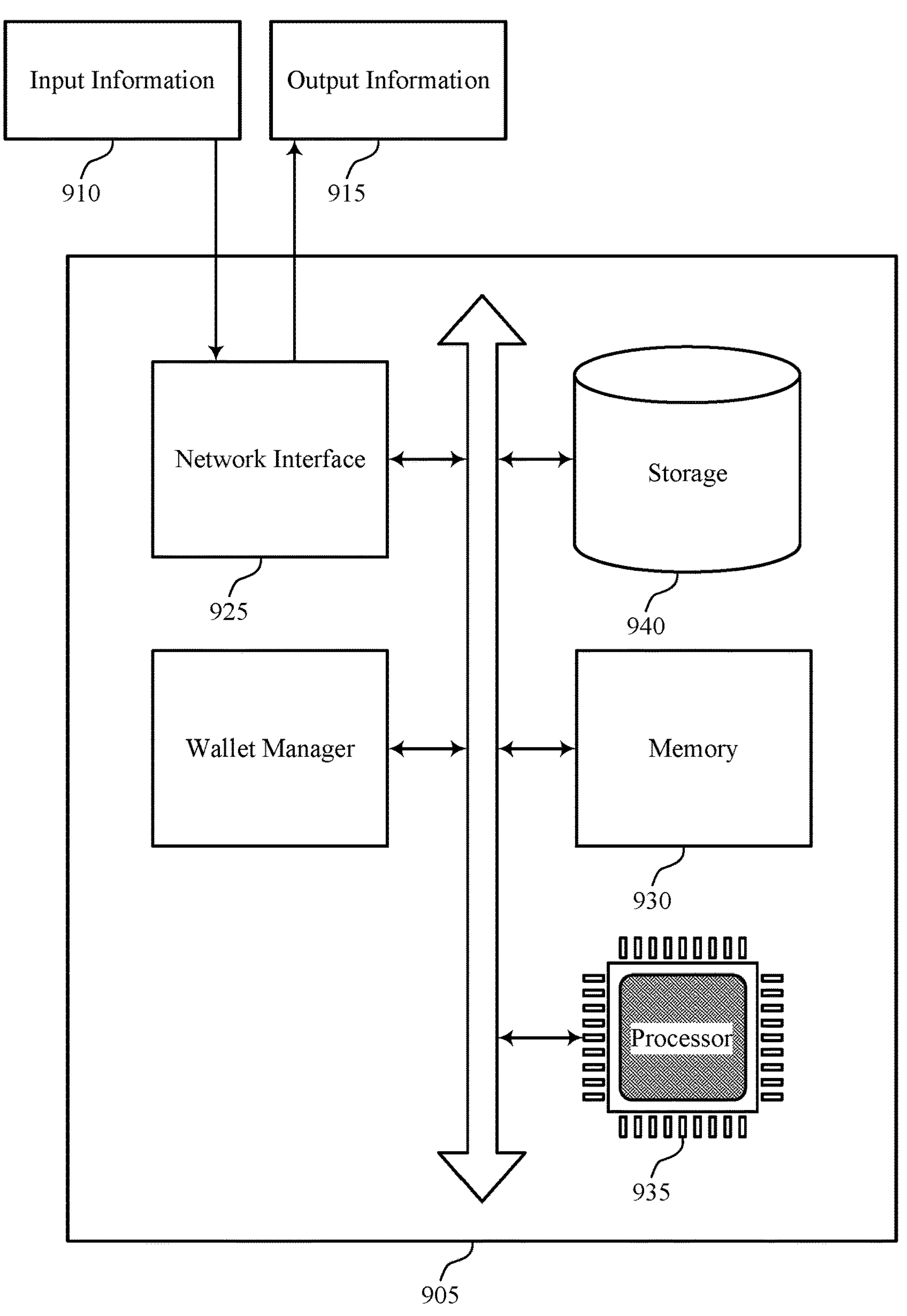
FIG. 9 shows a diagram of a system including a device that supports using a blockchain wallet for two-factor authentication in accordance with aspects of the present disclosure.

FIG. 9 shows a diagram 900 of a system 905 that supports using a blockchain wallet for two-factor authentication in accordance with aspects of the present disclosure. The system 905 may be an example of or include the components of a system 705 as described herein. The system 905 may include components for bi-directional voice and data communications including components for transmitting and receiving communications, such as a two-factor authentication manager 920, an input information 910, an output information 915, a network interface 925, a memory 930, a processor 935, and a storage 940. Each of these components may be in communication with one another (e.g., via one or more buses, communications links, communications interfaces, or any combination thereof).

The network interface 925 may enable the system to exchange information (e.g., input information 910, output information 915, or both) with other systems or devices (not shown). For example, the network interface 925 may enable the system to connect to a network (e.g., a network 135 as described herein). The network interface 925 may include one or more wireless network interfaces, one or more wired network interfaces, or any combination thereof.

Memory 930 may include RAM, ROM, or both. The memory 930 may store computer-readable, computer-executable software including instructions that, when executed, cause the processor 935 to perform various functions described herein, such as functions supporting using a blockchain wallet for two-factor authentication. In some cases, the memory 930 may contain, among other things, a basic input/output system (BIOS), which may control basic hardware or software operation such as the interaction with peripheral components or devices. In some cases, the memory 930 may be an example of aspects of one or more components of a custodial token platform 110 as described with reference to FIG. 1.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in a memory 930 to perform various functions (e.g., functions or tasks supporting using a blockchain wallet for two-factor authentication). Though a single processor 935 is depicted in the example of FIG. 9, it is to be understood that the system 905 may include any quantity of one or more of processors 935 and that a group of processors 935 may collectively perform one or more functions ascribed herein to a processor, such as the processor 935.

Storage 940 may be configured to store data that is generated, processed, stored, or otherwise used by the system 905. In some cases, the storage 940 may include one or more HDDs, one or more SDDs, or both. In some examples, the storage 940) may be an example of a single database, a distributed database, multiple distributed databases, a data store, a data lake, or an emergency backup database. In some examples, the storage 940) may be an example of one or more components described with reference to FIG. 1, such as one or more network disks.

The two-factor authentication manager 920 may support authenticating a client application in accordance with examples as disclosed herein. For example, the two-factor authentication manager 920 may be configured as or otherwise support a means for receiving, at one or more servers and from the client application on a user device, an authentication request that is associated with a first user account for a service supported by the one or more servers. The two-factor authentication manager 920 may be configured as or otherwise support a means for transmitting, to the client application, a response that indicates that a wallet authentication procedure is enabled for the first user account, the response including a wallet address associated with the first user account. The two-factor authentication manager 920 may be configured as or otherwise support a means for receiving, at the one or more servers and from the client application in accordance with the wallet authentication procedure, a challenge request that includes the wallet address. The two-factor authentication manager 920 may be configured as or otherwise support a means for transmitting, to the client application, a challenge response that includes a data payload to be signed using a private key associated with the wallet address. The two-factor authentication manager 920 may be configured as or otherwise support a means for receiving, at the one or more servers and from the client application, a signed response message after transmitting the challenge response. The two-factor authentication manager 920 may be configured as or otherwise support a means for verifying, at the one or more servers, that the signing response message is validly signed by the private key associated with the wallet address. The two-factor authentication manager 920 may be configured as or otherwise support a means for transmitting, to the client application after verifying that the signed response message is validly signed, an indication that the signed response message is validly signed.

By including or configuring the two-factor authentication manager 920 in accordance with examples as described herein, the system 905 may support techniques for increased security of accounts associated with the user, as well as provide an efficient way to authenticate the user using the existing wallet associated with the user.

Figure 10:
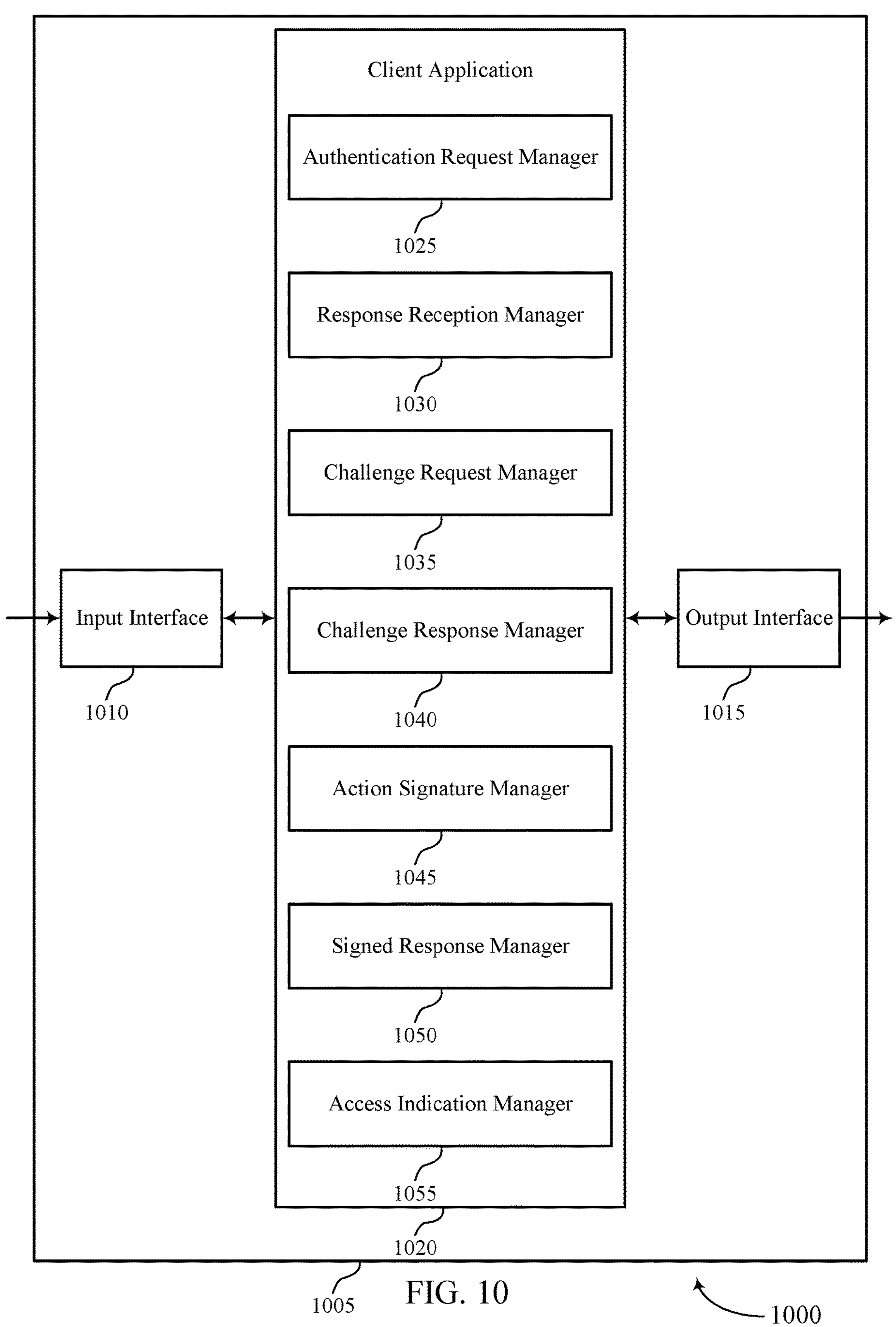
FIG. 10 shows a block diagram of an apparatus that supports using a blockchain wallet for two-factor authentication in accordance with aspects of the present disclosure.

FIG. 10 shows a block diagram 1000 of a device 1005 that supports using a blockchain wallet for two-factor authentication in accordance with aspects of the present disclosure. The device 1005 may include an input interface 1010, an output interface 1015, and a client application 1020. The device 1005 may also include a processor. Each of these components may be in communication with one another (e.g., via one or more buses).

The input interface 1010 may manage input signaling for the user device 1005. For example, the input interface 1010 may receive input signaling (e.g., messages, packets, data, instructions, commands, transactions, or any other form of encoded information) from other systems or devices. The input interface 1010 may send signaling corresponding to (e.g., representative of or otherwise based on) such input signaling to other components of the user device 1005 for processing. For example, the input interface 1010 may transmit such corresponding signaling to the client application 1020 to support using a blockchain wallet for two-factor authentication. In some cases, the input interface 1010 may be a component of a communication interface 1210 as described with reference to FIG. 12.

The output interface 1015 may manage output signaling for the user device 1005. For example, the output interface 1015 may receive signaling from other components of the system 805, such as the client application 1020, and may transmit such output signaling corresponding to (e.g., representative of or otherwise based on) such signaling to other systems or devices. In some cases, the input interface 1010 may be a component of a communication interface 1210 as described with reference to FIG. 12.

For example, the client application 1020 may include an authentication request manager 1025, a response reception manager 1030, a challenge request manager 1035, a challenge response manager 1040, an action signature manager 1045, a signed response manager 1050, an access indication manager 1055, or any combination thereof. In some examples, the client application 1020, or various components thereof, may be configured to perform various operations (e.g., receiving, monitoring, transmitting) using or otherwise in cooperation with the input interface 1010, the output interface 1015, or both. For example, the client application 1020 may receive information from the input interface 1010, send information to the output interface 1015, or be integrated in combination with the input interface 1010, the output interface 1015, or both to receive information, transmit information, or perform various other operations as described herein.

The client application 1020 may support authenticating a client application in accordance with examples as disclosed herein. The authentication request manager 1025 may be configured as or otherwise support a means for transmitting, to one or more servers and from the client application, an authentication request that is associated with a first user account for a service supported by the one or more servers. The response reception manager 1030 may be configured as or otherwise support a means for receiving, from the one or more servers, a response that indicates that a wallet authentication procedure is enabled for the first user account, the response including a wallet address associated with the first user account. The challenge request manager 1035 may be configured as or otherwise support a means for transmitting, to the one or more servers and from the client application in accordance with the wallet authentication procedure, a challenge request that includes the wallet address. The challenge response manager 1040 may be configured as or otherwise support a means for receiving, at the client application, a challenge response that includes a data payload. The action signature manager 1045 may be configured as or otherwise support a means for performing, at the client application, an action to generate a signed response message using the data payload. The signed response manager 1050 may be configured as or otherwise support a means for transmitting, to the one or more servers, the signed response message. The access indication manager 1055 may be configured as or otherwise support a means for receiving, at the client application, information that supports access to the service by the client application.

Figure 11:
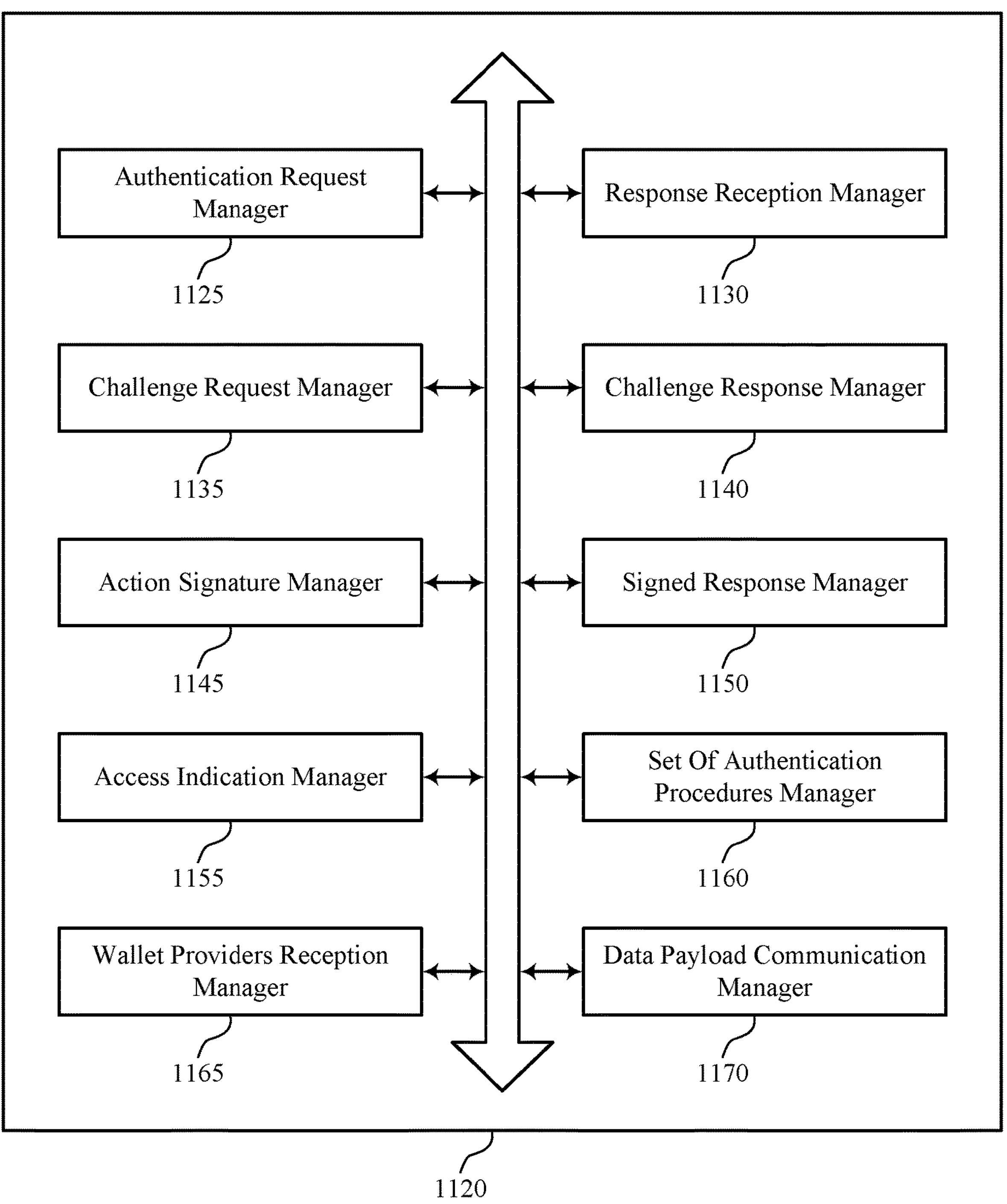
FIG. 11 shows a block diagram of a client application that supports using a blockchain wallet for two-factor authentication in accordance with aspects of the present disclosure.

FIG. 11 shows a block diagram 1100 of a client application 1120 that supports using a blockchain wallet for two-factor authentication in accordance with aspects of the present disclosure. The client application 1120 may be an example of aspects of a client application or a client application 1020, or both, as described herein. The client application 1120, or various components thereof, may be an example of means for performing various aspects of using a blockchain wallet for two-factor authentication as described herein. For example, the client application 1120 may include an authentication request manager 1125, a response reception manager 1130, a challenge request manager 1135, a challenge response manager 1140, an action signature manager 1145, a signed response manager 1150, an access indication manager 1155, a set of authentication procedures manager 1160, a wallet providers reception manager 1165, a data payload communication manager 1170, or any combination thereof. Each of these components may communicate, directly or indirectly, with one another (e.g., via one or more buses).

The client application 1120 may support authenticating a client application in accordance with examples as disclosed herein. The authentication request manager 1125 may be configured as or otherwise support a means for transmitting, to one or more servers and from the client application, an authentication request that is associated with a first user account for a service supported by the one or more servers. The response reception manager 1130 may be configured as or otherwise support a means for receiving, from the one or more servers, a response that indicates that a wallet authentication procedure is enabled for the first user account, the response including a wallet address associated with the first user account. The challenge request manager 1135 may be configured as or otherwise support a means for transmitting, to the one or more servers and from the client application in accordance with the wallet authentication procedure, a challenge request that includes the wallet address. The challenge response manager 1140 may be configured as or otherwise support a means for receiving, at the client application, a challenge response that includes a data payload. The action signature manager 1145 may be configured as or otherwise support a means for performing, at the client application, an action to generate a signed response message using the data payload. The signed response manager 1150 may be configured as or otherwise support a means for transmitting, to the one or more servers, the signed response message. The access indication manager 1155 may be configured as or otherwise support a means for receiving, at the client application, information that supports access to the service by the client application.

In some examples, the set of authentication procedures manager 1160 may be configured as or otherwise support a means for receiving at least one input to enable a set of authentication procedures of a plurality of authentication procedures for the first user account, wherein the set of enabled authentication procedures comprises at least the wallet authentication procedure.

In some examples, the wallet authentication procedure is enabled for a plurality of wallet addresses associated with the first user account. In some examples, the response indicates the plurality of wallet addresses.

In some examples, the wallet providers reception manager 1165 may be configured as or otherwise support a means for receiving, at the client application, a selection of a wallet provider, of a plurality of wallet providers, for authenticating at the service supported by the one or more servers.

In some examples, to support receiving the challenge response, the challenge response manager 1140 may be configured as or otherwise support a means for receiving the challenge response that includes information indicating the action to be performed by the client application, wherein the action to be performed by the client application includes providing the signed response message received from a wallet application.

In some examples, the data payload communication manager 1170 may be configured as or otherwise support a means for communicating, to the wallet application, the data payload to be signed by a private key associated with the wallet application and the first user account, wherein the signed response message is received after communicating the data payload to the wallet application.

In some examples, to support receiving the information, the access indication manager 1155 may be configured as or otherwise support a means for receiving a proof token at the client application. In some examples, the one or more servers support a custodial token platform.

Figure 12:
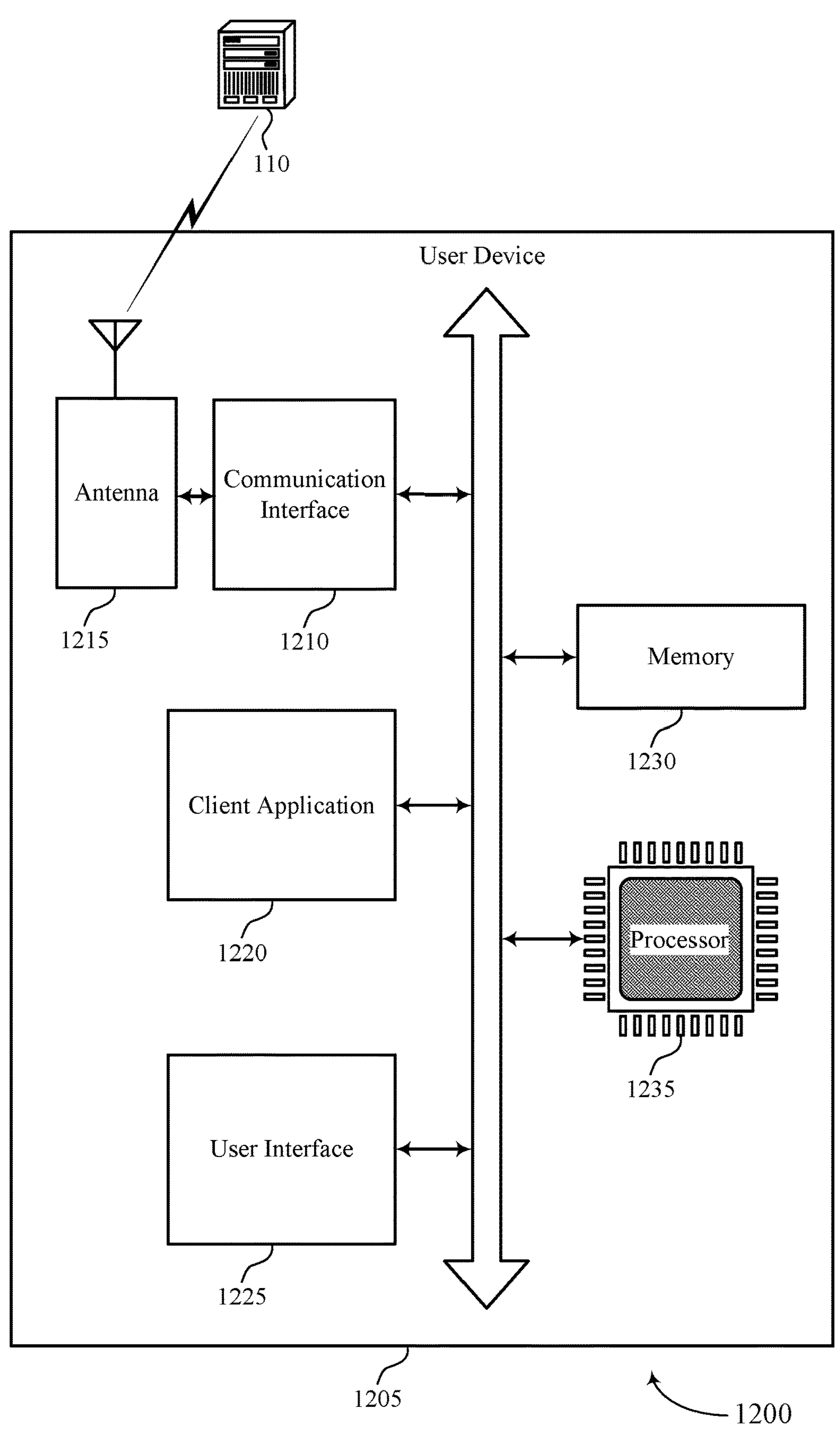
FIG. 12 shows a diagram of a system including a device that supports using a blockchain wallet for two-factor authentication in accordance with aspects of the present disclosure.

FIG. 12 shows a diagram of a system 1200 including a device 1205 that supports using a blockchain wallet for two-factor authentication in accordance with aspects of the present disclosure. The device 1205 may be an example of or include the components of a device 1005 as described herein. The device 1205 may include components for bi-directional voice and data communications including components for transmitting and receiving communications, such as a client application 1220, a communication interface 1210, an antenna 1215, a user interface 1225, a memory 1230, and a processor 1235. Each of these components may be in communication with one another (e.g., via one or more buses, communications links, communications interfaces, or any combination thereof).

The communication interface 1210 may manage input and output signals for the device 1205 via the antenna 1215. For example, the communication interface 1210 may enable the user device 1205 to exchange information (e.g., input information, output information, or both) with other systems or devices, such as custodial token platform 110 (e.g., supported by one or more servers), via one or more wired or wireless communication links. The communication interface 1210 may also utilize or interact with antenna 1215 to support communication with other systems or devices. In some cases, the communication interface 1210 may represent a physical connection or port to an external peripheral, such as a hardware wallet device. In some cases, the communication interface 1210 may utilize an operating system such as iOS®, ANDROID®, MS-DOS®, MS-WINDOWS®, OS/2®, UNIX®, LINUX®, or another known operating system. The communication interface 1210 may be implemented as part of the processor 1235.

In some cases, the device 1205 may include a single antenna 1215. However, in some other cases, the device 1205 may have more than one antenna 1215, which may be capable of concurrently transmitting or receiving multiple wireless transmissions. The communication interface 1210 may communicate bi-directionally, via the one or more antennas 1215, wired, or wireless links as described herein. For example, the communication interface 1210 may represent a wireless transceiver and may communicate bi-directionally with another wireless transceiver. The communication interface 1210 may also include a modem to modulate the packets, to provide the modulated packets to one or more antennas 1215 for transmission, and to demodulate packets received from the one or more antennas 1215.

The user interface 1225 may represent interact with a keyboard, a mouse, a touchscreen, a microphone, or a similar device or component. In some cases, a user may interact with the user interface 1225. In other cases, the user interface 1225 may operate automatically without user interaction. The user interface 1225 may display or output information such as information received from other systems or devices or information to be transmitted to other systems or devices.

The memory 1230 may include RAM and ROM. The memory 1230 may store computer-readable, computer-executable software including instructions that, when executed, cause the processor 1235 to perform various functions described herein. In some cases, the memory 1230 may contain, among other things, a BIOS which may control basic hardware or software operation such as the interaction with peripheral components or devices.

The processor 1235 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1235 may be configured to operate a memory array using a memory controller. In other cases, a memory controller may be integrated into the processor 1235. The processor 1235 may be configured to execute computer-readable instructions stored in a memory 1230 to perform various functions (e.g., functions or tasks supporting a method and system for using a blockchain wallet for two-factor authentication). Though a single processor 1235 is depicted in the example of FIG. 12, it is to be understood that the user device 1205 may include any quantity of one or more of processors 1235 and that a group of processors 1235 may collectively perform one or more functions ascribed herein to a processor, such as the processor 1235.

The client application 1220 may support authenticating a client application in accordance with examples as disclosed herein. For example, the client application 1220 may be configured as or otherwise support a means for transmitting, to one or more servers and from the client application, an authentication request that is associated with a first user account for a service supported by the one or more servers. The client application 1220 may be configured as or otherwise support a means for receiving, from the one or more servers, a response that indicates that a wallet authentication procedure is enabled for the first user account, the response including a wallet address associated with the first user account. The client application 1220 may be configured as or otherwise support a means for transmitting, to the one or more servers and from the client application in accordance with the wallet authentication procedure, a challenge request that includes the wallet address. The client application 1220 may be configured as or otherwise support a means for receiving, at the client application, a challenge response that includes a data payload. The client application 1220 may be configured as or otherwise support a means for performing, at the client application, an action to generate a signed response message using the data payload. The client application 1220 may be configured as or otherwise support a means for transmitting, to the one or more servers, the signed response message. The client application 1220 may be configured as or otherwise support a means for receiving, at the client application, information that supports access to the service by the client application.

By including or configuring the client application 1220 in accordance with examples as described herein, the device 1205 may support techniques for increased security of accounts associated with the user, as well as provide an efficient way to authenticate the user using the existing wallet associated with the user.

The client application 1220 may include an application (e.g., "app"), program, software, extension, or other component which is configured to facilitate communications with a custodial token platform 110 on a server, one or more nodes of a blockchain network 105, other user devices 1205, and other devices or systems. For example, the client application 1220 may be an application executable on the user device 1205, and the client application 1220 may be configured to receive data from a custodial token platform 110, transmit data to the custodial token platform 110, process such data, and cause presentation of such data to a user via a user interface 1225. The client application 1220 may be an example of a wallet application, a wallet device, or both, and may be associated with a wallet address and may access or use a private key to sign messages to facilitate transfer of crypto tokens, messages, transactions, or the like via a blockchain distributed data store.

Figure 13:
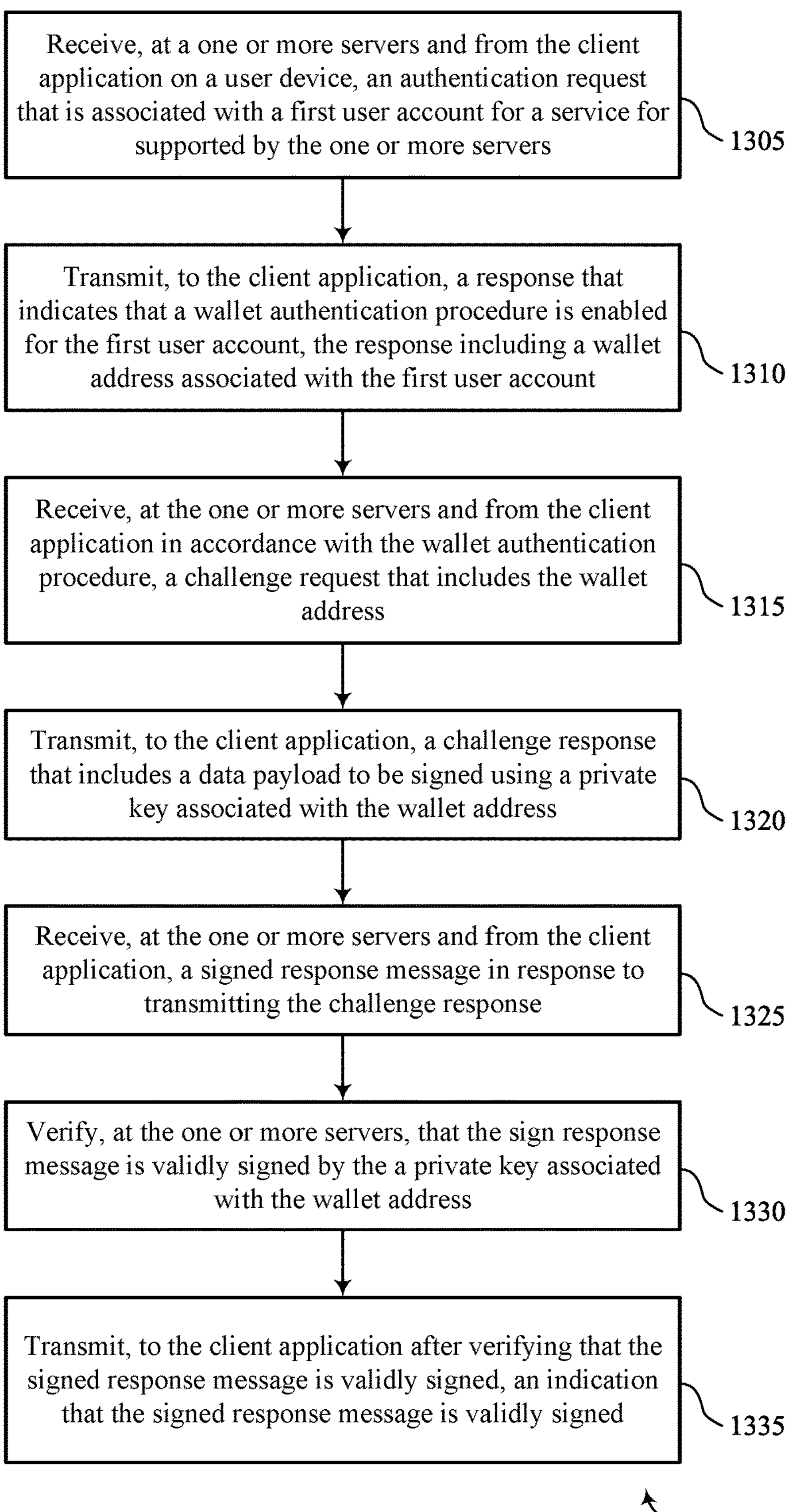
FIGS. 13 and 14 show flowcharts illustrating methods that support using a blockchain wallet for two-factor authentication in accordance with aspects of the present disclosure.

FIG. 13 shows a flowchart illustrating a method 1300 that supports using a blockchain wallet for two-factor authentication in accordance with aspects of the present disclosure. The operations of the method 1300 may be implemented by a custodial token platform or its components as described herein. For example, the operations of the method 1300 may be performed by a custodial token platform as described with reference to FIGS. 1 through 9. In some examples, a custodial token platform may execute a set of instructions to control the functional elements of the custodial token platform to perform the described functions. Additionally, or alternatively, the custodial token platform may perform aspects of the described functions using special-purpose hardware.

At 1305, the method may include receiving, at one or more servers and from the client application on a user device, an authentication request that is associated with a first user account for a service supported by the one or more servers. The operations at 1305 may be performed in accordance with examples as disclosed herein. In some examples, aspects of the operations of 1305 may be performed by an authentication request manager 825 as described with reference to FIG. 8.

At 1310, the method may include transmitting, to the client application, a response that indicates that a wallet authentication procedure is enabled for the first user account, the response including a wallet address associated with the first user account. The operations at 1310 may be performed in accordance with examples as disclosed herein. In some examples, aspects of the operations of 1310 may be performed by a response transmission manager 830 as described with reference to FIG. 8.

At 1315, the method may include receiving, at the one or more servers and from the client application in accordance with the wallet authentication procedure, a challenge request that includes the wallet address. The operations at 1315 may be performed in accordance with examples as disclosed herein. In some examples, aspects of the operations of 1315 may be performed by a challenge request manager 835 as described with reference to FIG. 8.

At 1320, the method may include transmitting, to the client application, a challenge response that includes a data payload to be signed using a private key associated with the wallet address. The operations at 1320 may be performed in accordance with examples as disclosed herein. In some examples, aspects of the operations of 1320 may be performed by a challenge response manager 840 as described with reference to FIG. 8.

At 1325, the method may include receiving, at the one or more servers and from the client application, a signed response message in response to transmitting the challenge response. The operations at 1325 may be performed in accordance with examples as disclosed herein. In some examples, aspects of the operations of 1325 may be performed by a signed response manager 845 as described with reference to FIG. 8.

At 1330, the method may include verifying, at the one or more servers, that the signed response message is validly signed by the private key associated with the wallet address. The operations at 1330 may be performed in accordance with examples as disclosed herein. In some examples, aspects of the operations of 1330 may be performed by a verification response manager 850 as described with reference to FIG. 8.

At 1335, the method may include transmitting, to the client application after verifying that the signed response message is validly signed, an indication that the signed response message is validly signed. The operations at 1335 may be performed in accordance with examples as disclosed herein. In some examples, aspects of the operations of 1335 may be performed by an indication transmission manager 855 as described with reference to FIG. 8.

Figure 14:
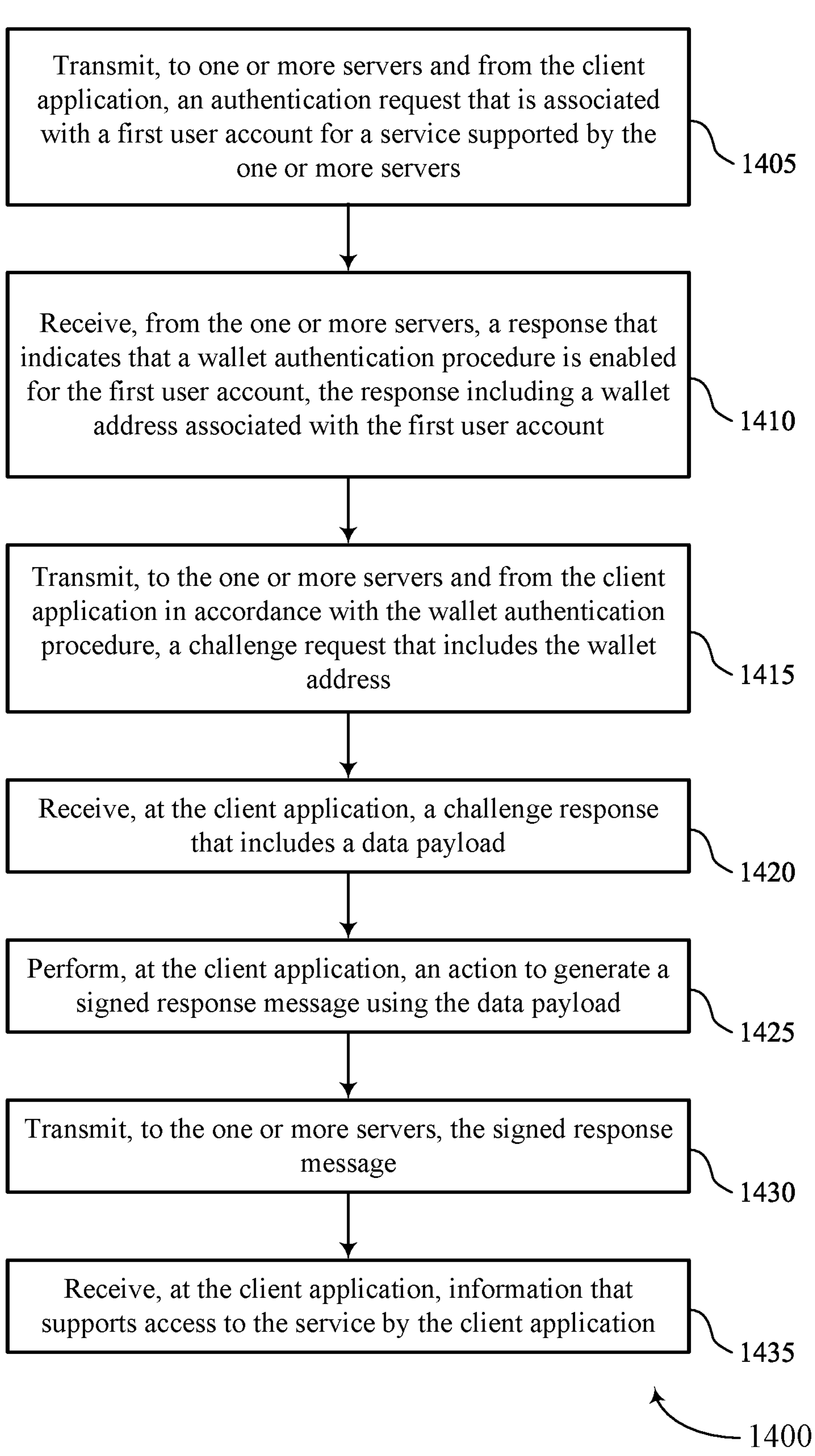

FIG. 14 shows a flowchart illustrating a method 1400 that supports using a blockchain wallet for two-factor authentication in accordance with aspects of the present disclosure. The operations of the method 1400 may be implemented by a user device or its components as described herein. For example, the operations of the method 1400 may be performed by a user device as described with reference to FIGS. 1 through 6 and 10 through 12. In some examples, a user device may execute a set of instructions to control the functional elements of the user device to perform the described functions. Additionally, or alternatively, the user device may perform aspects of the described functions using special-purpose hardware.

At 1405, the method may include transmitting, to one or more servers and from the client application, an authentication request that is associated with a first user account for a service supported by the one or more servers. The operations at 1405 may be performed in accordance with examples as disclosed herein. In some examples, aspects of the operations of 1405 may be performed by an authentication request manager 1125 as described with reference to FIG. 11.

At 1410, the method may include receiving, from the one or more servers, a response that indicates that a wallet authentication procedure is enabled for the first user account, the response including a wallet address associated with the first user account. The operations at 1410 may be performed in accordance with examples as disclosed herein. In some examples, aspects of the operations of 1410 may be performed by a response reception manager 1130 as described with reference to FIG. 11.

At 1415, the method may include transmitting, to the one or more servers and from the client application in accordance with the wallet authentication procedure, a challenge request that includes the wallet address. The operations at 1415 may be performed in accordance with examples as disclosed herein. In some examples, aspects of the operations of 1415 may be performed by a challenge request manager 1135 as described with reference to FIG. 11.

At 1420, the method may include receiving, at the client application, a challenge response that includes a data payload. The operations at 1420 may be performed in accordance with examples as disclosed herein. In some examples, aspects of the operations of 1420 may be performed by a challenge response manager 1140 as described with reference to FIG. 11.

At 1425, the method may include performing, at the client application, an action to generate a signed response message using the data payload. The operations at 1425 may be performed in accordance with examples as disclosed herein. In some examples, aspects of the operations of 1425 may be performed by an action signature manager 1145 as described with reference to FIG. 11.

At 1430, the method may include transmitting, to the one or more servers, the signed response message. The operations at 1430 may be performed in accordance with examples as disclosed herein. In some examples, aspects of the operations of 1430 may be performed by a signed response manager 1150 as described with reference to FIG. 11.

At 1435, the method may include receiving, at the client application, information that supports access to the service by the client application. The operations at 1435 may be performed in accordance with examples as disclosed herein. In some examples, aspects of the operations of 1435 may be performed by an access indication manager 1155 as described with reference to FIG. 11.

A method for authenticating a client application is described. The method may include receiving, at one or more servers and from the client application on a user device, an authentication request that is associated with a first user account for a service supported by the one or more servers, transmitting, to the client application, a response that indicates that a wallet authentication procedure is enabled for the first user account, the response including a wallet address associated with the first user account, receiving, at the one or more servers and from the client application in accordance with the wallet authentication procedure, a challenge request that includes the wallet address, transmitting, to the client application, a challenge response that includes a data payload to be signed using a private key associated with the wallet address, receiving, at the one or more servers and from the client application, a signed response message in response to transmitting the challenge response, verifying, at the one or more servers, that the signed response message is validly signed by the private key associated with the wallet address, and transmitting, to the client application after verifying that the signed response message is validly signed, an indication that the signed response message is validly signed.

An apparatus for authenticating a client application is described. The apparatus may include at least one processor, at least one memory coupled with the at least one processor, and instructions stored in the at least one memory. The instructions may be executable by the at least one processor to cause the apparatus to receive, at one or more servers and from the client application on a user device, an authentication request that is associated with a first user account for a service supported by the one or more servers, transmit, to the client application, a response that indicates that a wallet authentication procedure is enabled for the first user account, the response including a wallet address associated with the first user account, receive, at the one or more servers and from the client application in accordance with the wallet authentication procedure, a challenge request that includes the wallet address, transmit, to the client application, a challenge response that includes a data payload to be signed using a private key associated with the wallet address, receive, at the one or more servers and from the client application, a signed response message in response to transmitting the challenge response, verifying, at the one or more servers, that the sign response message is validly signed by the private key associated with the wallet address, and transmit, to the client application after verifying that the signed response message is validly signed, an indication that the signed response message is validly signed.

Another apparatus for authenticating a client application is described. The apparatus may include means for receiving, at one or more servers and from the client application on a user device, an authentication request that is associated with a first user account for a service supported by the one or more servers, means for transmitting, to the client application, a response that indicates that a wallet authentication procedure is enabled for the first user account, the response including a wallet address associated with the first user account, means for receiving, at the one or more servers and from the client application in accordance with the wallet authentication procedure, a challenge request that includes the wallet address, means for transmitting, to the client application, a challenge response that includes a data payload to be signed using a private key associated with the wallet address, means for receiving, at the one or more servers and from the client application, a signed response message in response to transmitting the challenge response, means for verifying, at the one or more servers, that the signed response message is validly signed by the private key associated with the wallet address, and means for transmitting, to the client application after verifying that the signed response message is validly signed, an indication that the signed response message is validly signed.

A non-transitory computer-readable medium storing code for authenticating a client application is described. The code may include instructions executable by at least one processor to receive, at one or more servers and from the client application on a user device, an authentication request that is associated with a first user account for a service supported by the one or more servers, transmit, to the client application, a response that indicates that a wallet authentication procedure is enabled for the first user account, the response including a wallet address associated with the first user account, receive, at the one or more servers and from the client application in accordance with the wallet authentication procedure, a challenge request that includes the wallet address, transmit, to the client application, a challenge response that includes a data payload to be signed using a private key associated with the wallet address, receive, at the one or more servers and from the client application, a signed response message in response to transmitting the challenge response, verifying, at the one or more servers, that the sign response message is validly signed by the private key associated with the wallet address, and transmit, to the client application after verifying that the signed response message is validly signed, an indication that the signed response message is validly signed.

Some examples of the method, apparatuses, and non-transitory computer-readable medium described herein may further include operations, features, means, or instructions for identifying, after receiving the authentication request, that a set of authentication procedures of a plurality of authentication procedures may be enabled for the first user account, wherein the response indicates the set of enabled authentication procedures.

Some examples of the method, apparatuses, and non-transitory computer-readable medium described herein may further include operations, features, means, or instructions for identifying, after receiving the authentication request, that the wallet authentication procedure may be enabled for a plurality of wallet addresses associated with the first user account, wherein the response indicates the plurality of wallet addresses.

Some examples of the method, apparatuses, and non-transitory computer-readable medium described herein may further include operations, features, means, or instructions for storing the challenge response in at least one memory of the one or more servers in association with the wallet address, wherein the signed response message may be verified using the stored challenge response.

In some examples of the method, apparatuses, and non-transitory computer-readable medium described herein, transmitting the challenge response may include operations, features, means, or instructions for transmitting the challenge response that includes information indicating an action to be performed by the client application, wherein the action to be performed by the client application includes obtaining the signed response message from a wallet application.

In some examples of the method, apparatuses, and non-transitory computer-readable medium described herein, verifying that the signed response message may be validly signed may include operations, features, means, or instructions for decoding the signed response message using the challenge response to identify the wallet address and verifying that the wallet address matches the wallet address stored in association with the challenge response.

In some examples of the method, apparatuses, and non-transitory computer-readable medium described herein, transmitting the indication that the signed response message may be validly signed information may include operations, features, means, or instructions for transmitting a proof token to the client application.

In some examples of the method, apparatuses, and non-transitory computer-readable medium described herein, the one or more servers support a custodial token platform.

A method for authenticating a client application is described. The method may include transmitting, to one or more servers and from the client application, an authentication request that is associated with a first user account for a service supported by the one or more servers, receiving, from the one or more servers, a response that indicates that a wallet authentication procedure is enabled for the first user account, the response including a wallet address associated with the first user account, transmitting, to the one or more servers and from the client application in accordance with the wallet authentication procedure, a challenge request that includes the wallet address, receiving, at the client application, a challenge response that includes a data payload, performing, at the client application, an action to generate a signed response message using the data payload, transmitting, to the one or more servers, the signed response message, and receiving, at the client application, information that supports access to the service by the client application.

An apparatus for authenticating a client application is described. The apparatus may include at least one processor, at least one memory coupled with the at least one processor, and instructions stored in the at least one memory. The instructions may be executable by the at least one processor to cause the apparatus to transmit, to one or more servers and from the client application, an authentication request that is associated with a first user account for a service supported by the one or more servers, indication of that a wallet authentication procedure is enabled for a first user account for a service supported by the one or more servers, receive, from the one or more servers, a response that indicates that a wallet authentication procedure is enabled for the first user account, the response including a wallet address associated with the first user account, transmit, to the one or more servers and from the client application in accordance with the wallet authentication procedure, a challenge request that includes the wallet address, receive, at the client application, a challenge response that includes a data payload, perform, at the client application, an action to generate a signed response message using the data payload, transmit, to the one or more servers, the signed response message, and receive, at the client application, information that supports access to the service by the client application.

Another apparatus for authenticating a client application is described. The apparatus may include means for transmitting, to one or more servers and from the client application, an authentication request that is associated with a first user account for a service supported by the one or more servers, indication of that a wallet authentication procedure is enabled for a first user account for a service supported by the one or more servers, means for receiving, from the one or more servers, a response that indicates that a wallet authentication procedure is enabled for the first user account, the response including a wallet address associated with the first user account, means for transmitting, to the one or more servers and from the client application in accordance with the wallet authentication procedure, a challenge request that includes the wallet address, means for receiving, at the client application, a challenge response that includes a data payload, means for performing, at the client application, an action to generate a signed response message using the data payload, means for transmitting, to the one or more servers, the signed response message, and means for receiving, at the client application, information that supports access to the service by the client application.

A non-transitory computer-readable medium storing code for authenticating a client application is described. The code may include instructions executable by at least one processor to transmit, to one or more servers and from the client application, an authentication request that is associated with a first user account for a service supported by the one or more servers, indication of that a wallet authentication procedure is enabled for a first user account for a service supported by the one or more servers, receive, from the one or more servers, a response that indicates that a wallet authentication procedure is enabled for the first user account, the response including a wallet address associated with the first user account, transmit, to the one or more servers and from the client application in accordance with the wallet authentication procedure, a challenge request that includes the wallet address, receive, at the client application, a challenge response that includes a data payload, perform, at the client application, an action to generate a signed response message using the data payload, transmit, to the one or more servers, the signed response message, and receive, at the client application, information that supports access to the service by the client application.

Some examples of the method, apparatuses, and non-transitory computer-readable medium described herein may further include operations, features, means, or instructions for receiving at least one input to enable a set of authentication procedures of a plurality of authentication procedures for the first user account, wherein the set of enabled authentication procedures comprises at least the wallet authentication procedure.

In some examples of the method, apparatuses, and non-transitory computer-readable medium described herein, the wallet authentication procedure may be enabled for a plurality of wallet addresses associated with the first user account and the response indicates the plurality of wallet addresses.

Some examples of the method, apparatuses, and non-transitory computer-readable medium described herein may further include operations, features, means, or instructions for receiving, at the client application, a selection of a wallet provider, of a plurality of wallet providers, for authenticating at the service supported by the one or more servers.

In some examples of the method, apparatuses, and non-transitory computer-readable medium described herein, receiving the challenge response may include operations, features, means, or instructions for receiving the challenge response that includes information indicating the action to be performed by the client application, wherein the action to be performed by the client application includes providing the signed response message received from a wallet application.

In some examples of the method, apparatuses, and non-transitory computer-readable medium described herein, communicating, to the wallet application, the data payload to be signed by a private key associated with the wallet application and the first user account, wherein the signed response message may be received after communicating the data payload to the wallet application.

In some examples of the method, apparatuses, and non-transitory computer-readable medium described herein, receiving the information may include operations, features, means, or instructions for receiving a proof token at the client application.

In some examples of the method, apparatuses, and non-transitory computer-readable medium described herein, the one or more servers support a custodial token platform.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for authenticating a client application, comprising:

receiving, at one or more servers supporting a custodial token platform and from the client application on a user device, an authentication request that is associated with a first user account at the custodial token platform supported by the one or more servers, the custodial token platform providing access to a blockchain wallet controlling one or more digital assets associated with the first user account;

receiving a first authentication factor of a two-factor authentication process for accessing the custodial token platform, the first authentication factor comprising at least one of a username and password combination or a phone authentication procedure for accessing the custodial token platform;

determining, after receiving the first authentication factor, that a wallet authentication procedure is enabled for the first user account at the custodial token platform, wherein the wallet authentication procedure is a second factor in the two-factor authentication process for accessing the custodial token platform;

transmitting, to the client application based at least in part on determining that the wallet authentication procedure is enabled for accessing the custodial token platform by the first user account, a response that indicates that the wallet authentication procedure is enabled for the first user account at the custodial token platform, the response including a blockchain wallet address of the blockchain wallet associated with the first user account at the custodial token platform;

receiving, at the one or more servers and from the client application in accordance with the wallet authentication procedure, a challenge request that includes the blockchain wallet address;

transmitting, to the client application, a challenge response that includes a data payload to be signed using a private key associated with the blockchain wallet address;

receiving, at the one or more servers and from the client application, a signed response message in response to transmitting the challenge response;

verifying, at the one or more servers using a public key that is associated with the private key, that the signed response message is validly signed by the private key associated with the blockchain wallet address, wherein the public key corresponds to the blockchain wallet address; and transmitting, by the custodial token platform and to the client application after verifying that the signed response message is validly signed, an indication that the signed response message is validly signed.

2. The method of claim 1, further comprising:

identifying, after receiving the authentication request, that a set of authentication procedures of a plurality of authentication procedures is enabled for the first user account, wherein the response indicates the set of enabled authentication procedures.

3. The method of claim 1, further comprising:

identifying, after receiving the authentication request, that the wallet authentication procedure is enabled for a plurality of blockchain wallet addresses associated with the first user account, wherein the response indicates the plurality of blockchain wallet addresses.

4. The method of claim 1, further comprising:

storing the challenge response in memory of the one or more servers in association with the blockchain wallet address, wherein the signed response message is verified using the stored challenge response.

5. The method of claim 1, wherein transmitting the challenge response comprises:

transmitting the challenge response that includes information indicating an action to be performed by the client application, wherein the action to be performed by the client application includes obtaining the signed response message from a blockchain wallet application.

6. The method of claim 1, wherein verifying that the signed response message is validly signed further comprises:

decoding the signed response message using the challenge response to identify the blockchain wallet address; and verifying that the blockchain wallet address matches the blockchain wallet address stored in association with the challenge response.

7. The method of claim 1, wherein transmitting the indication that the signed response message is validly signed further comprises:

transmitting a proof token to the client application.

8. An apparatus for authenticating a client application, comprising:

at least one processor;

at least one memory coupled with the at least one processor; and instructions stored in the at least one memory and executable by the at least one processor to cause the apparatus to:

receive, at one or more servers supporting a custodial token platform and from the client application on a user device, an authentication request that is associated with a first user account at the custodial token platform supported by the one or more servers, the custodial token platform providing access to a blockchain wallet controlling one or more digital assets associated with the first user account;

receive a first authentication factor of a two-factor authentication process for accessing the custodial token platform, the first authentication factor comprising at least one of a username and password combination or a phone authentication procedure for accessing the custodial token platform;

determine, after receiving the first authentication factor, that a wallet authentication procedure is enabled for the first user account at the custodial token platform, wherein the wallet authentication procedure is a second factor in the two-factor authentication process for accessing the custodial token platform;

transmit, to the client application based at least in part on determining that the wallet authentication procedure is enabled for accessing the custodial token platform by the first user account, a response that indicates that the wallet authentication procedure is enabled for the first user account at the custodial token platform, the response including a blockchain wallet address of the blockchain wallet associated with the first user account at the custodial token platform;

receive, at the one or more servers and from the client application in accordance with the wallet authentication procedure, a challenge request that includes the blockchain wallet address;

transmit, to the client application, a challenge response that includes a data payload to be signed using a private key associated with the blockchain wallet address;

receive, at the one or more servers and from the client application, a signed response message in response to transmitting the challenge response;

verify, at the one or more servers using a public key that is associated with the private key, that the signed response message is validly signed by the private key associated with the blockchain wallet address, wherein the public key corresponds to the blockchain wallet address; and transmit, by the custodial token platform to the client application after verifying that the signed response message is validly signed, an indication that the signed response message is validly signed.

9. The apparatus of claim 8, wherein the instructions are further executable by the at least one processor to cause the apparatus to:

identify, after receiving the authentication request, that a set of authentication procedures of a plurality of authentication procedures is enabled for the first user account, wherein the response indicates the set of enabled authentication procedures.

10. The apparatus of claim 8, wherein the instructions are further executable by the at least one processor to cause the apparatus to:

identify, after receiving the authentication request, that the wallet authentication procedure is enabled for a plurality of blockchain wallet addresses associated with the first user account, wherein the response indicates the plurality of blockchain wallet addresses.

11. The apparatus of claim 8, wherein the instructions are further executable by the at least one processor to cause the apparatus to:

store the challenge response in memory of the one or more servers in association with the blockchain wallet address, wherein the signed response message is verified using the stored challenge response.

12. The apparatus of claim 8, wherein the instructions to transmit the challenge response are executable by the at least one processor to cause the apparatus to:

transmit the challenge response that includes information indicating an action to be performed by the client application, wherein the action to be performed by the client application includes obtaining the signed response message from a blockchain wallet application.

13. The apparatus of claim 8, wherein the instructions to verify that the signed response message is validly signed are further executable by the at least one processor to cause the apparatus to:

decode the signed response message using the challenge response to identify the blockchain wallet address; and verify that the blockchain wallet address matches the blockchain wallet address stored in association with the challenge response.

14. The apparatus of claim 8, wherein the instructions to transmit the indication that the signed response message is validly signed are further executable by the at least one processor to cause the apparatus to:

transmit a proof token to the client application.

15. A non-transitory computer-readable medium storing code for authenticating a client application, the code comprising instructions executable by at least one processor to:

receive, at one or more servers supporting a custodial token platform and from the client application on a user device, an authentication request that is associated with a first user account at the custodial token platform supported by the one or more servers, the custodial token platform providing access to a blockchain wallet controlling one or more digital assets associated with the first user account;

receive a first authentication factor of a two-factor authentication process for accessing the custodial token platform, the first authentication factor comprising at least one of a username and password combination or a phone authentication procedure for accessing the custodial token platform;

determine, after receiving the first authentication factor, that a wallet authentication procedure is enabled for the first user account at the custodial token platform, wherein the wallet authentication procedure is a second factor in the two-factor authentication process for accessing the custodial token platform;

transmit, to the client application based at least in part on determining that the wallet authentication procedure is enabled for accessing the custodial token platform by the first user account, a response that indicates that the wallet authentication procedure is enabled for the first user account at the custodial token platform, the response including a blockchain wallet address of the blockchain wallet associated with the first user account at the custodial token platform;

receive, at the one or more servers and from the client application in accordance with the wallet authentication procedure, a challenge request that includes the blockchain wallet address;

transmit, to the client application, a challenge response that includes a data payload to be signed using a private key associated with the blockchain wallet address;

receive, at the one or more servers and from the client application, a signed response message in response to transmitting the challenge response;

verify, at the one or more servers using a public key that is associated with the private key, that the signed response message is validly signed by the private key associated with the blockchain wallet address, wherein the public key corresponds to the blockchain wallet address; and transmit, by the custodial token platform and to the client application after verifying that the signed response message is validly signed, an indication that the signed response message is validly signed.

16. The non-transitory computer-readable medium of claim 15, wherein the instructions are further executable by the at least one processor to:

identify, after receiving the authentication request, that a set of authentication procedures of a plurality of authentication procedures is enabled for the first user account, wherein the response indicates the set of enabled authentication procedures.

17. The non-transitory computer-readable medium of claim 15, wherein the instructions are further executable by the at least one processor to:

identify, after receiving the authentication request, that the wallet authentication procedure is enabled for a plurality of blockchain wallet addresses associated with the first user account, wherein the response indicates the plurality of blockchain wallet addresses.

18. The non-transitory computer-readable medium of claim 15, wherein the instructions are further executable by the at least one processor to:

store the challenge response in memory of the one or more servers in association with the blockchain wallet address, wherein the signed response message is verified using the stored challenge response.

* * * * *